US 8,095,657 B2

(12) United States Patent
E et al.

(10) Patent No.: US 8,095,657 B2
(45) Date of Patent: Jan. 10, 2012

(54) FIRST THREAD LOCK MANAGEMENT FOR DISTRIBUTED DATA SYSTEMS

(75) Inventors: Sandhya E, Bangalore (IN); Ajay Kumar, Bangalore (IN)

(73) Assignee: Oracle America, Inc., Redwood City, CA (US)

( * ) Notice: Subject to any disclaimer, the term of this patent is extended or adjusted under 35 U.S.C. 154(b) by 3212 days.

(21) Appl. No.: 10/202,312

(22) Filed: Jul. 24, 2002

(65) Prior Publication Data
US 2004/0019679 A1 Jan. 29, 2004

(51) Int. Cl.
*G06F 15/173* (2006.01)

(52) U.S. Cl. .......................... 709/226; 709/224; 707/704

(58) Field of Classification Search .......... 709/224–226, 709/100; 718/102–104, 107; 719/330; 707/8, 707/704
See application file for complete search history.

(56) References Cited

U.S. PATENT DOCUMENTS

| 4,399,504 | A | 8/1983 | Obermarck et al. |
| 5,060,144 | A | 10/1991 | Sipple et al. |
| 5,140,685 | A | 8/1992 | Sipple et al. |
| 5,327,556 | A | 7/1994 | Mohan et al. |
| 5,410,697 | A | 4/1995 | Baird et al. |
| 5,551,046 | A | 8/1996 | Mohan et al. |
| 5,596,754 | A | 1/1997 | Lomet |
| 6,032,216 | A | 2/2000 | Schmuck et al. |
| 6,148,377 | A | 11/2000 | Careter et al. |
| 6,247,025 | B1 * | 6/2001 | Bacon .......................... 707/206 |
| 6,324,581 | B1 | 11/2001 | Xu et al. |
| 6,330,604 | B1 | 12/2001 | Higuchi et al. |
| 6,401,110 | B1 | 6/2002 | Freitas et al. |
| 6,411,983 | B1 * | 6/2002 | Gallop .......................... 718/104 |
| 6,470,487 | B1 | 10/2002 | Zolotykh et al. |
| 6,510,478 | B1 | 1/2003 | Jeffords et al. |
| 6,564,234 | B2 | 5/2003 | Bamford et al. |
| 6,622,155 | B1 * | 9/2003 | Haddon et al. ................ 718/100 |
| 6,751,616 | B1 | 6/2004 | Chan |
| 6,829,609 | B1 | 12/2004 | Wagner |
| 6,836,887 | B1 | 12/2004 | Such |
| 6,883,026 | B1 | 4/2005 | Onoder et al. |
| 6,934,933 | B2 | 8/2005 | Wilkinson et al. |
| 2002/0046230 | A1 * | 4/2002 | Dieterich et al. ............. 709/107 |

(Continued)

OTHER PUBLICATIONS

Hagimont et al., "A Configurable RMI Mechanism for Sharing Distributed Java Objects," IEEE Internet Computing, Jan./Feb. 2001 (pp. 36-43).

(Continued)

*Primary Examiner* — Greg C Bengzon
(74) *Attorney, Agent, or Firm* — Robert C. Kowert; Meyertons, Hood, Kivlin, Kowert & Goetzel, P.C.

(57) ABSTRACT

A distributed data system may include nodes hosting at least one multi-threaded process operable to access portions of distributed data. A lock mechanism may grant locks to multi-threaded processes for portions of the distributed data. Only a process holding a lock may access a portion corresponding to the lock. Threads of other processes may not access the portion. A process may include a first thread to request access to a distributed data portion that may acquire a lock for the distributed data portion on behalf of the process. In one embodiment, the lock mechanism may require only a thread that acquired a lock release the lock on behalf of a process. In embodiments, the first thread may release the lock in response to no more threads of the process require access to the distributed data portion and/or in response to a request to release the lock.

33 Claims, 12 Drawing Sheets

U.S. PATENT DOCUMENTS

| | | | |
|---|---|---|---|
| 2002/0052959 A1* | 5/2002 | Freitas et al. | 709/226 |
| 2003/0018785 A1* | 1/2003 | Eshel et al. | 709/226 |
| 2004/0002974 A1* | 1/2004 | Kravitz et al. | 707/8 |
| 2004/0019639 A1 | 1/2004 | E. et al. | |
| 2004/0019660 A1 | 1/2004 | E. et al. | |
| 2004/0019892 A1 | 1/2004 | E. et al. | |
| 2004/0225922 A1 | 11/2004 | Susarla et al. | |

OTHER PUBLICATIONS

"iPlanet Application Server—Overview Guide," Version 6.0, Sun Microsystems, May 2000, (78 Pages).

Surdenau et al., "Design and Performance Analysis of a Distributed Java Virtual Machine" IEEE Transactions, on Parallel and Distributed Systems, vol. 13, No. 6, Jun. 2002, (pp. 611-627).

* cited by examiner

FIRST THREAD LOCK MANAGEMENT FOR DISTRIBUTED DATA SYSTEMS

BACKGROUND OF THE INVENTION

1. Field of the Invention

This invention relates to distributed data systems, and more particularly to data locking for multi-threaded processes in distributed data systems.

2. Description of the Related Art

In distributed data systems, data may be stored in several locations. Such locations may include servers, computers, or other devices with storage devices or access to storage devices. Storage devices may include hard drives, memory, registers, and other media where data can be stored and retrieved. A distributed data system may span a large network or combination of networks, for example on the Internet or a local intranet, or simply involve a plurality of storage devices connected to a computing device. The data may be distributed in blocks of specific sizes, by file, or any fashion according with space constraints of available storage devices.

Distributed data may facilitate scalability, fail-safe techniques, and security. For example, a server may distribute activity to remain scalable with respect to network traffic. In this example, distributed data may include state information for each process and/or computing system over which a client-server interaction is distributed in an enterprise system. The distributed data may include a snapshot of interaction or a session between a web browser and a web server. The snapshot or session state may include one or more of the state of the web browser process(es), the state of the computing system hosting the web browser, the state of the web server process(es), the state of the computing system hosting the web server, the state of the computing system hosting an application server providing content to the web server, the state of the application server process(es), and the state of one or more applications, processes and/or threads hosted by the application server or optionally on any other system involved in the interaction.

An enterprise computing system storing distributed session data is only one example of a distributed data system. Distributed data system may store and share any type across a plurality of computing nodes. Distributed data systems may provide for load balancing and fail over to improve the overall quality of service of the system.

Primary data may be defined as a global instance of distributed data accessible by one or more processes. The term "process" is used herein to refer to a computer process. A distributed data system may include primary data stored within a distributed store. Local data may be defined as an instance of distributed data stored locally with respect to a process. Local data may provide read and/or write access to portions of the distributed data for a process. The local data may be used to update the primary data of the distributed store.

A client-server environment may use distributed data, for example. The distributed data may include session data for one or more sessions. A session may include a series of user-application interactions that may be tracked by one or more servers. Sessions may be used for maintaining user-specific states, and may include persistent objects (e.g. handles to Enterprise Java Beans and/or database record sets) and authenticated user identities, among other interactions. For example, a session may be used to track a validated user login followed by a series of directed activities for that particular user. The session may reside in a server. For each request, a client may transmit a session ID in a cookie or, if the client does not allow cookies, the server may automatically write a session ID into a URL. The session ID may be used as a database key to access persistent objects associated with the client. Types of sessions may include, but are not limited to, distributed sessions and local sessions. Distributed sessions may be distributed among multiple servers, for example in a cluster, whereas local sessions may be bound to an individual server. In other systems, distributed data may include other types of data and may not necessarily include session data.

Client-server applications may store distributed session information as snapshots of the states of participating processes, resources, and computing systems to minimize data loss in case of failure. Current techniques for accessing state information from distributed sessions may result in inconsistent distributed data and consume significant amounts of resources.

A portion of distributed data may be retrieved and written by multiple processes concurrently, resulting in a risk of data loss. For example, a first process may access a portion of local data representing an instance of a portion of distributed data, while a second process may accesses a portion of local data representing another instance of the same portion of distributed data. Then, the first process may update the primary data. The second process may update the primary data after the first process. Portions of the primary data updated by the first process may be overwritten, resulting in loss of data. This data loss may be referred to as "data clobbering."

In distributed data systems, it may be desirable for a process to access portions of distributed data using the same or similar semantics used in accessing portions of local non-distributed data. Typically, to help prevent data clobbering, a distributed data system may include a lock mechanism. The lock mechanism may grant locks to processes for portions of primary data. While a process holds a lock for a portion of primary data, other processes may not access the locked portion. Other processes may hold locks for other portions of primary data. Managing locks may be a complex task for the primary or backend portions of distributed data that are accessible by multiple different processes in a distributed system. This complexity may be even greater for systems including multithreaded processes in which multiple threads of a process share access to a local instance of a portion of distributed data.

SUMMARY OF THE INVENTION

A distributed data system may include a plurality of nodes each including a process that may be able to access distributed data. In one embodiment, the distributed data may include components of session data representing client sessions for clients of a multi-tiered enterprise application. A distributed data store that may be accessible by the nodes may store the distributed data.

In one embodiment, the nodes may include one or more application servers of a multi-tiered enterprise application. Components of session data may each represent the state of a client session for a client of the multi-tiered enterprise application. Processes of the nodes may include Java™ virtual machines residing within one of the one or more application servers.

A lock mechanism may be coupled to the distributed data store. The lock mechanism may grant locks to processes for portions of the distributed data. Only threads of a process holding a lock may access a portion of distributed data corresponding to the lock. Threads of other processes may not access the portion. In one embodiment, the lock mechanism may require that only a thread that requested a lock and was granted the lock may release the lock for the process.

A process may include one or more threads each of which may be configured to access distributed data portions and configured to request a lock for a portion of the distributed data for access by threads of the process. For example, if the process does not have a lock for a portion of primary data desired by a thread of the process, the thread may request a lock for the primary data portion from the lock mechanism on behalf of the process. Since the process did not already own the lock, the thread first acquiring the lock for its process for the primary data portion may be referred to as the "first thread."

In one embodiment, while a first thread holds a lock corresponding to a portion of primary data, the lock mechanism may buffer one or more requests for the lock for the portion from one or more other processes. If the process releases the lock for the portion, the lock mechanism may grant the lock for the particular portion to one of the other processes in response to the other process's buffered request.

In one embodiment, a first thread holding a lock corresponding to a primary data portion may release the lock for the process when threads of the process no longer require access to the portion. In one embodiment, to determine whether threads of the process no longer require access to the portion, the process may include a count. If a thread of the process requests access to the portion, the count may be incremented the count. If a thread no longer requires access to the particular portion (e.g. the thread may finish executing), the count may be decremented the count.

In another embodiment, the first thread may hold a lock until the process receives a request to release the lock. In embodiments, the lock mechanism and/or another process (e.g. a process that requires access to a portion corresponding to the lock) may request that the process release the lock. In some embodiments, if the lock mechanism and/or another process requests release of a lock for a portion, the first thread may release the lock for the process. In one embodiment, the lock may be released or requested to be released if the distributed session pertaining to the locked distributed data is invalidated or times-out. In one embodiment, by holding the lock until requested to release the lock, the process may help reduce resources (e.g. network resources, processing resources) associated with requesting locks, granting locks, and releasing locks.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

Figure 1:
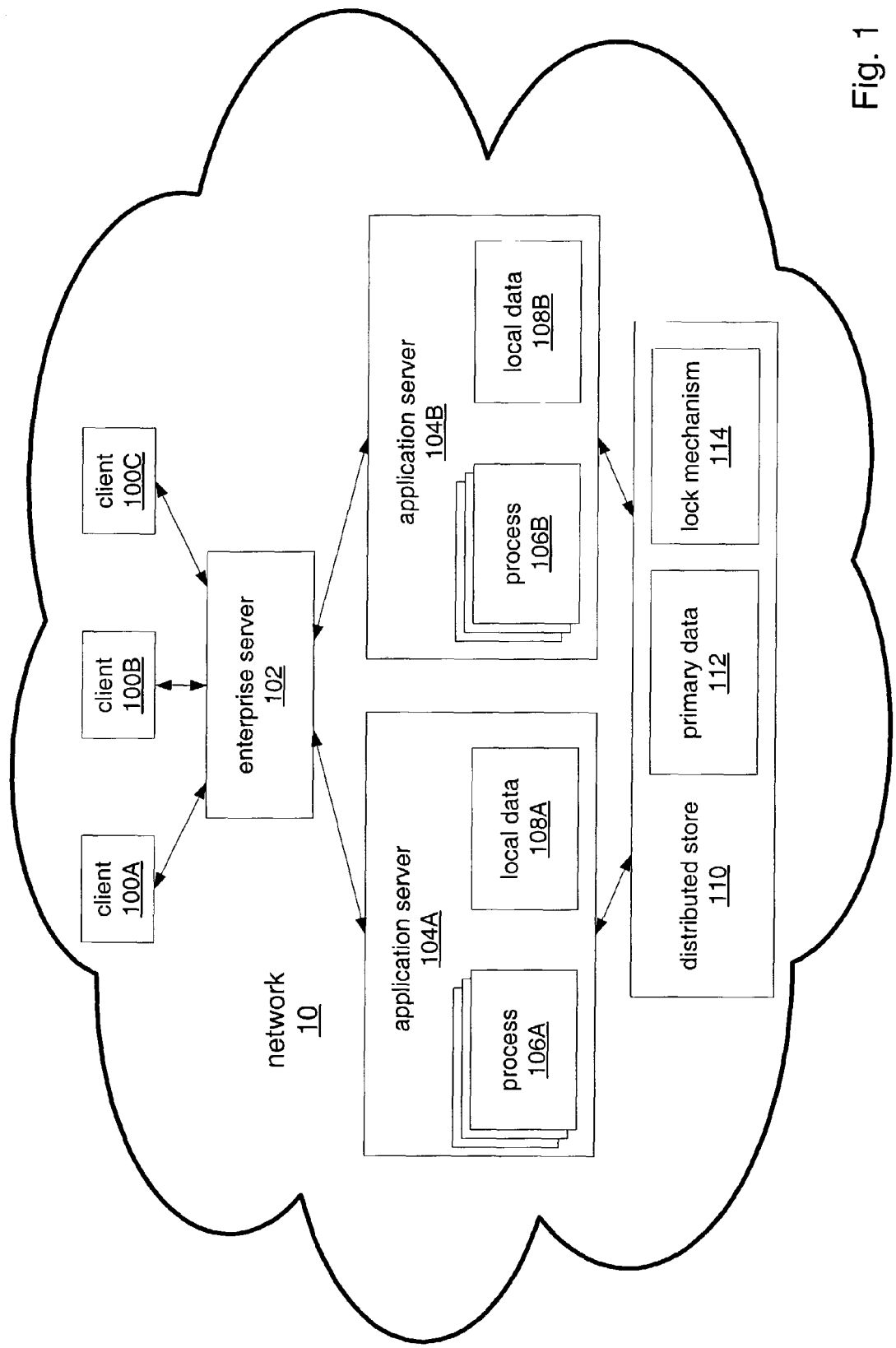
FIG. 1 illustrates an example of a distributed data system as an enterprise information system (EIS) with distributed data, according to one embodiment.

FIG. 1 illustrates an example of a distributed data system as an enterprise information system (EIS) with distributed data, according to one embodiment. Note other embodiments may include other types of distributed data systems in which access to data is shared by multiple nodes or processes, for example. Referring to FIG. 1, enterprise server 102 may include one or more servers (e.g. web servers) that provide content to the remote clients 100 over network 10. Network 10 may be a wired or wireless network or a combination thereof, and may include a LAN, WAN, Internet, or a combination thereof. Any of a variety of one or more networking protocols may be used in the network, for example, TCP/IP. Application servers 104A and 104B may include processes 106A and 106B respectively that may be used by the clients 100 to apply business logic to enterprise data. Application servers 104A and 104B may include local data 108A and 108B respectively. Clients 100A, 100B, and 100C may be any of a variation of devices such as desktop personal computers, laptops, PDAs, and point-of-sale terminals running client applications such as web browsers.

In this example, distributed data may include, but is not limited to, information related to environmental attributes, processes, and client-server interaction. For example, clients 100 may include web browsers accessing content generated by applications of application servers 104. Local data 108 are local instances of distributed data maintained by the application servers, for example, for use by local clients of the application servers or by processes executing within the application servers. Distributed store 110 may store persistent data including one or more instances of primary data 112. Primary data 112 may include an instance of the distributed data that is globally accessible by the application servers. In one embodiment, primary data 112 may be distributed on the network across one or more computer-accessible mediums (e.g. RAID systems and/or database systems). In one embodiment, one or more instances or copies of primary data 112 may be maintained on one or more backend systems that may serve as, for example, backup systems and/or fail-over systems. In one embodiment, distributed store 110 may include storage on one or more computer systems that also host one or more of application servers 104.

The clients 100 may interact with enterprise server 102 via network 10. Enterprise server 102 may be implemented or clustered across one or more of the same computer systems as application servers 104, or on one or more separate computer systems. Enterprise server 102 may serve as a front end to the application servers for the clients 100. A client 100 may interact with enterprise server 102 during a session or during multiple sessions. In one embodiment, the applications and/or processes within the application servers may provide data and/or services to enterprise server 102, for example, for use by the clients. An application server 104 may send updates of distributed data to distributed store 110 in response to an event such as a modification of one or more attributes of the local data 108 and/or as routine maintenance to synchronize the primary data with the local data 108. An attribute may be a portion or element of the distributed data, and may be one of any of various types of data that may be used in a process such as programming language objects or classes (e.g. Java objects or classes), strings, integers, Booleans, characters, real number representations, or any other type of computer-representable data.

Distributed store 110 may implement a lock mechanism 114. Lock mechanism 114 may grant locks to processes 106 for portions of primary data 112. While a process 106 holds a lock for a portion of primary data 112, other processes 106 may not access the portion. However, other processes 106 may hold locks for other portions of primary data 106. In one embodiment, a process 106 may hold one or more locks each corresponding to one or more portions of primary data 112. A thread of a multithreaded process 106 may request a lock for a portion of primary data 112 for the process 106 from lock mechanism 114. Lock mechanism 114 may grant the lock to the thread for the process 106.

In one embodiment, to access distributed data, a process 106 executing within an application server 104 may request a lock (e.g. mutex lock) for a portion of primary data 112 from lock mechanism 114. A process 106 may include, but is not limited to, a virtual machine (e.g. a Java™ virtual machine). If another process does not currently hold the lock for the portion of primary data 112, lock mechanism 114 may issue the lock to the requesting process 106. If another process holds the lock for the portion of primary data 112, the requesting process 106 may enter a wait state or alternatively may continue executing another task while waiting for the lock. In one embodiment, the request may be queued by lock mechanism 114.

In one embodiment, a 'lazy' lock release may be used in which, when the process no longer requires locked access, the process does not release the lock immediately but may instead wait for a request for the lock. For example, process 106A implementing lazy lock release may hold a lock for a portion of primary data 112. Threads of process 106A may finish accessing the locked portion. However, process 106A may not release the lock for the portion in response to the threads finishing. Additional threads of process 106A may subsequently start and finish accessing the portion while the process holds the lock. Another process 106B may request the lock for the portion of primary data 112 from lock mechanism 114. In one embodiment, lock mechanism 114 may request that process 106A release the lock in response to the request from process 106B. In another embodiment, the other process 106B may request that the process 106A release the lock. Process 106A may release the lock in response to the request to release the lock. In one embodiment, process 106A may allow one or more threads accessing the distributed data to finish accessing the distributed data before releasing the lock or implement a priority mechanism to determine when to release the lock.

In one embodiment, locking a portion of primary data 112 may include obtaining a token for the portion. The token may include, but is not limited to, a string or a numeric identifier. A process that does not hold a token for a portion of primary data 112 may not be allowed access to the portion until the process requests and receives the token. A process 106 may request locked access to a portion of primary data 112 from lock mechanism 114. Lock mechanism 114 may send a reply message to the process 106 including a token for the portion if the portion is not locked for another process. The process 106 may access the primary data 112 portion after receiving the token. The process 106 may release the lock for the primary data 112 portion by sending a release message to the lock mechanism including the token. In one embodiment, as discussed above, the process 106 may not release the lock until requested to release the lock.

Figure 2:
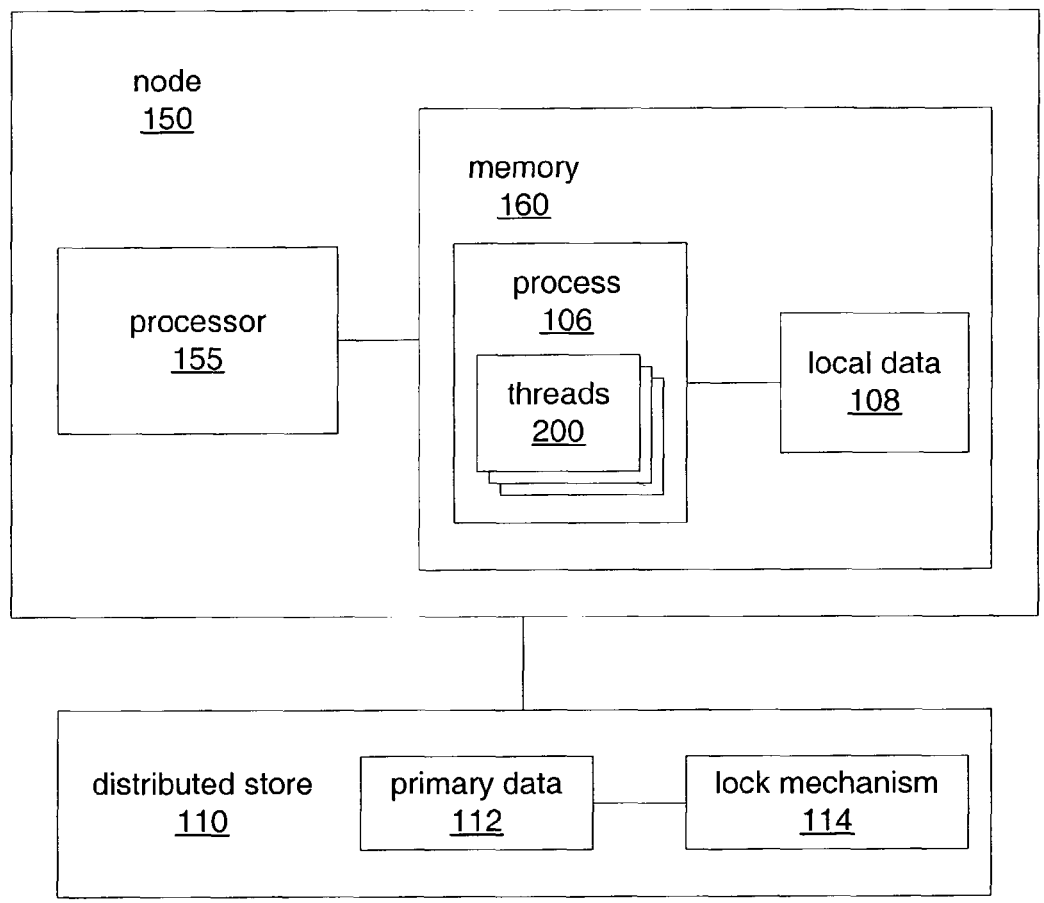
FIG. 2 illustrates one embodiment of a node in a system such as the system of FIG. 1 configured to implement various embodiments such as described herein for providing locked access to portions of distributed data to a multithreaded process in a distributed system in which multiple processes may share access to the distributed data.

FIG. 2 illustrates one embodiment of a node in a system such as the system of FIG. 1 configured to implement various embodiments such as described herein for providing locked access to portions of distributed data to a multithreaded process in a distributed system in which multiple processes may share access to the distributed data. Node 150 may include processor 155 and memory 160. Memory 160 may include program instructions executable by processor 155 to implement process 106. Process 106 may include one or more threads 200 configured to access a lock mechanism to lock a portion of primary data 112, a global instance of distributed data, for process 106 as described above. One or more of threads 200 may be configured to access portions of local data 108, a local instance of the distributed data. In one embodiment, for example, node 150 may be, but is not limited to, a networked desktop computer, a workstation, or a server, for example.

Figure 3A:
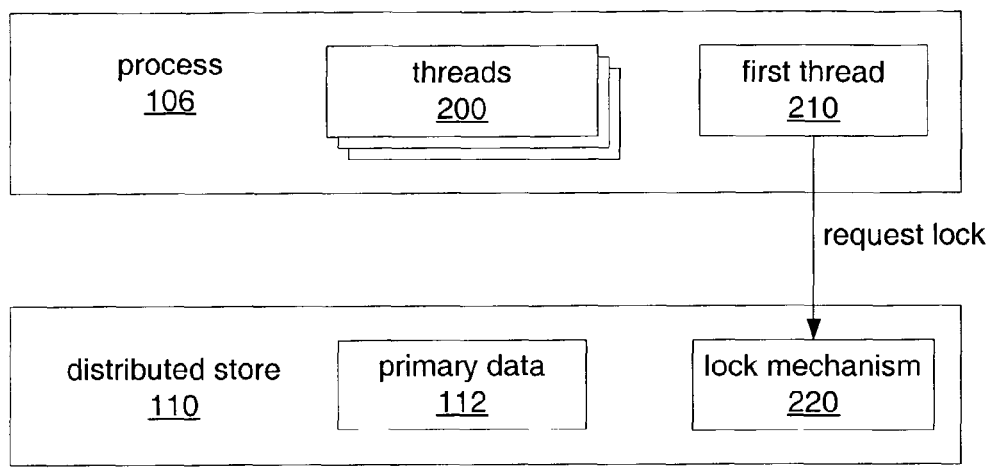
FIGS. 3A-3C illustrate one embodiment of providing locked access to distributed data to a multithreaded process in a distributed system in which multiple processes may share access to the distributed data.
Figure 3B:
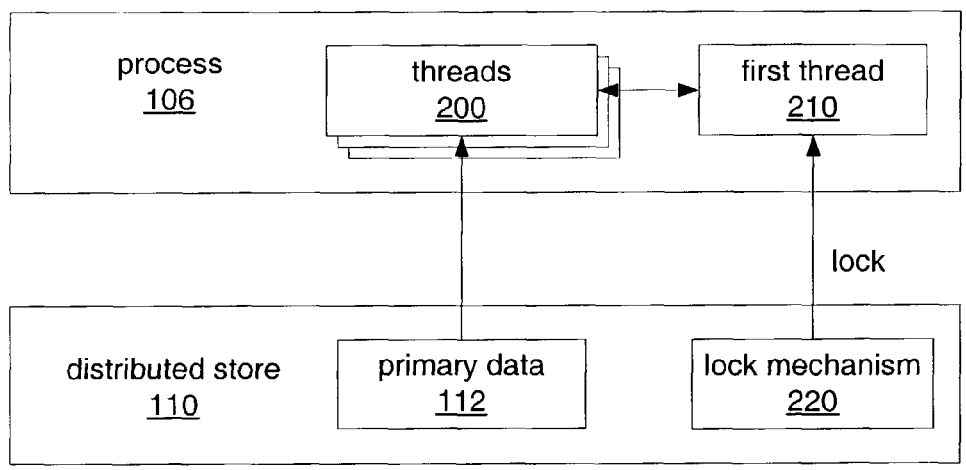
Figure 3C:
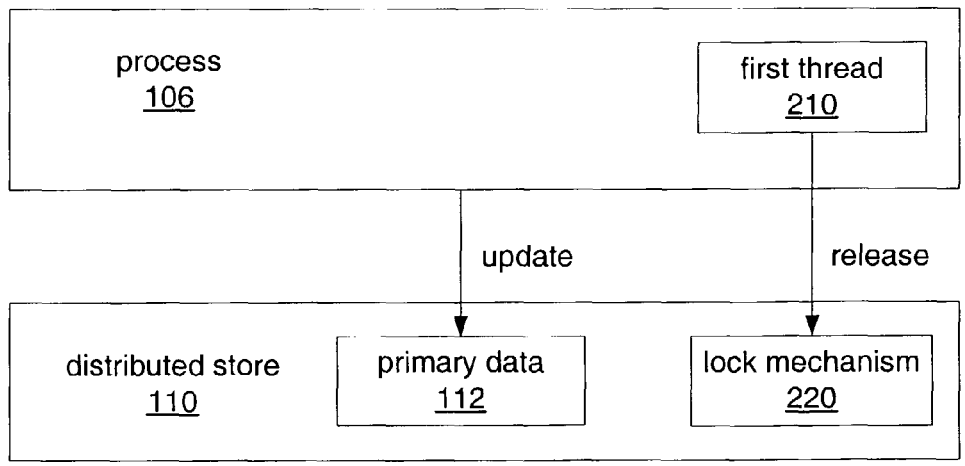

FIGS. 3A-3C illustrate one embodiment of providing locked access to distributed data to a multithreaded process in a distributed system in which multiple processes may share access to the distributed data, such as the system of FIG. 1. In one embodiment, primary data 112 may include a plurality of portions of distributed data that represent global instances of portions of the distributed data. In one embodiment, for example, each portion may represent a state of a client session for a client of the multitiered enterprise system. In other embodiments, primary data 112 may include other types of distributed data. A lock mechanism 220 may be associated with distributed store 110 for controlling access to primary data 112. Lock mechanism 220 may grant locks for each of the portions. In one embodiment, only a holder of a lock may have access to primary data corresponding to the lock.

In one embodiment, distributed store 110 may include lock mechanism 220. In another embodiment, lock mechanism 220 may be associated with but distinct from distributed store 110. For example, lock mechanism 220 may be implemented in a separate process. In one embodiment, lock mechanism 220 may arbitrate access to primary data 112 for process 106 and other processes to help prevent concurrent accesses to primary data 112 that may lead to data inconsistencies within primary data 112. If lock mechanism 220 grants a lock for a portion of primary data 112 for a process, other processes may be prevented from accessing the locked portion.

A process 106 may be a multithreaded process. One or more threads 200 of process 106 may require access to distributed data. A thread 200 may check whether process 106 currently holds a lock for a portion of primary data 112. In one embodiment, a local data manager (e.g. a dedicated thread) of process 106 may keep track of locks currently held by process 106. The thread 200 desiring access to the data may check with the local data manager to determine whether process 106 holds a lock for the desired portion of primary data 112. If process 106 holds the appropriate lock, the thread 200 may access local data that represents a local instance of the distributed primary data portion.

If process 106 does not have the lock for the desired portion of primary data 112, the thread 200 may request a lock for the primary data 112 portion from lock mechanism 220 for process 106. Since the process 106 did not already own the lock, the thread 200 first acquiring the lock for its process for the primary data 112 portion may be referred to as the "first thread" 210. In FIG. 3A, the first thread 210 may request the lock for the primary data 112 portion from lock mechanism 220. In FIG. 3B, lock mechanism 220 may grant the lock for the primary data 112 portion to first thread 210. In one embodiment, while process 106 holds the lock for the primary data 112 portion, lock mechanism 220 may buffer requests for the lock for the primary data 112 portion from other processes. If process 106 releases the lock for the primary data 112 portion, lock mechanism 220 may grant the lock for the primary data 112 portion to one of the other processes in response to a corresponding buffered request.

First thread 210 may acquire the lock on behalf of process 106 so that access to local data representing an instance of the distributed data portion may be provided to the one or more threads 200 that may require access to the distributed data portion. In one embodiment, access to the distributed data may be managed by the local data manager. In one embodiment, first thread 210 may be the local data manager for the data for which it acquired the lock. In one embodiment, the local data manager may implement a thread-level locking mechanism for portions or all of the local data. If a thread of process 106 holds a local lock for portions or all of the local data, other threads of process 106 may not access the local thread locked portions of the local data. Thus, first thread 210 may obtain a lock from lock mechanism 220 for a portion of primary data 112 and the lock may be held for the first thread's process 106 so that other threads 200 of the same process may also access the locked portion of primary data 112. The process 106 may include an inter-thread locking mechanism to handle concurrent accesses by its thread to the local instance of locked portion of primary data.

After being granted the lock from lock mechanism 220, first thread 210 may access the distributed data. First thread 210 may stay alive (e.g. continue executing) after it finishes accessing the distributed data so that it will be available to release the lock when it is time for the process 106 to release the lock for the primary data portion. In one embodiment, first thread 210 may remain in a wait state until it is time to release the lock. In another embodiment, first thread 210 may perform local data management for the locked portion (e.g. keeping a count of threads requiring access to the distributed data and/or managing thread-level locking) until the lock is released. One or more other threads 200 may access the distributed data portion while process 106 owns the lock.

In one embodiment, first thread 210 may remain executing within process 106 while other threads 200 access the distributed data portion. In FIG. 3C, first thread 210 may release the lock for primary data 112 portion if no more threads of process 106 require access to the distribute data portion. In one embodiment, first thread 210 may determine whether no more threads of process 106 require access to the distributed data portion. In another embodiment, a local data manager or another thread 200 may notify the first thread that no more threads require access to the distributed data port. In one embodiment, for example, process 106 may include a count of threads requiring access to the distributed data for determining whether any threads of process 106 require access to the distributed data portion.

In one embodiment, a local data manager may implement a count mechanism to keep track of the count. The count may be initialized to zero. First thread 210 may obtain the lock and increment the count. If a thread of process 106 requests access to the distributed data portion (including first thread 210), the count may be incremented. If the thread no longer requires access to the distributed data portion (e.g. when a thread completes its access of the data), the count may be decremented. For example, the thread may have finished executing. In embodiments, each thread requiring access to the distributed data portion may be configured to increment the count when it requests access to the distributed data portion and/or decrement the count when it finishes accessing the distributed data portion. In other embodiments, a local data manager may increment the count for each thread that requires access to the distributed data portion and/or decrement the count for each thread that finishes accessing the distributed data portion. In one embodiment, for example, a thread requiring access to the distributed data portion may notify the local data manager. The local data manager may increment the count in response to the notification. If a thread finishes accessing the distributed data portion, the thread may notify the local data manager that it has finished. The local data manager may decrement the count in response to the notification that the thread has finished.

As a result of the count being decremented for each thread that finishes accessing the distributed data portion, the count may take the value of zero if no threads of process 106 require access to the distributed data portion. In embodiments, the value of count may be checked at every increment and/or decrement (e.g. by the local data manager). In another embodiment, the value of count may be checked periodically (e.g. by the local data manager). In still yet other embodiments, the count reaching zero may trigger an event that may notify first thread 210 or the local data manager that there are no more threads requiring access to the distributed data portion. In one embodiment, for example, the local data manager may check the count. The local data manager may determine that the count is zero. The local data manager may notify first thread 210 (or first thread 210 may be the local data manager, in one embodiment). If the count is zero, first thread 210 may determine that no more threads of process 106 require access to the distributed data portion and release the corresponding lock.

In one embodiment, lock mechanism 220 may require that the same thread that is granted a lock for a process must release the lock for the process. First thread 210 (the thread that initially acquired the lock for its process 106) may remain alive within process 106 to release the lock for the portion of primary data 112, as described above. If first thread 210 determines that no more threads of process 106 require access to the distributed data, first thread 210 may release the lock for the portion of primary data 112 for process 106.

In embodiments, a thread 200 may be configured to send an invalidate request to the local data manager or first thread 210 that requests release of the lock for the primary data 112 portion. This may occur in response to a request from lock mechanism 220 or another process to release the lock for a particular portion of the primary data 112 or may be triggered by the end of a session. In one embodiment, one of the threads 200 may send an invalidate request to first thread 210 to release the lock for the primary data 112 portion. For example, the primary data 112 portion may represent a client session of the multi-tiered enterprise application. The client session may end (i.e. expire). For example, the client may remain inactive and/or unresponsive for a period of time. The enterprise application may require that, if the client session expires, locks for primary data 112 portions representing the client session be released. In one embodiment, a thread 200 of process 106 may have access to a value indicating whether a session has expired (e.g. the value may be included in the distributed data). In another embodiment, the session expiration may trigger an event that may notify the thread 200 that the session has expired.

The thread 200 of process 106 may send an invalidate request to release the lock even if other threads 200 of process 106 still require access or are accessing the portion of primary data 112 (e.g. if the count is nonzero) in response to the session expiration. First thread 210 may receive the invalidate request. In embodiments, the local data manager or first thread 210 may implement a priority system for requests to access the local data from the threads 200 and invalidate requests from the threads 200. The invalidate request may receive a lower or higher priority than one or more requests to access portions of local data depending on the priority scheme. One or more threads may access portions of the local data before first thread 210 or the local data manager respond to the invalidate request. First thread 210 may release the lock for primary data 112 portion for process 106 in response to the invalidate request after higher priority requests are dealt with. In one embodiment, first thread 210 may notify the thread 200 that issued the invalidate request that the lock has been released.

In one embodiment, if the lock for the portion of primary data 112 is released, primary data 112 may be updated with the local data accessed by threads of process 106. In one embodiment, only the modified portions of the local data may be used to update primary data 112. In another embodiment, all the local data may be used to update primary data 112. In still yet another embodiment, distributed store 110 may update primary data 112 periodically. For example, distributed store 110 may update primary data 112 when network traffic is at a minimum.

Figure 4:
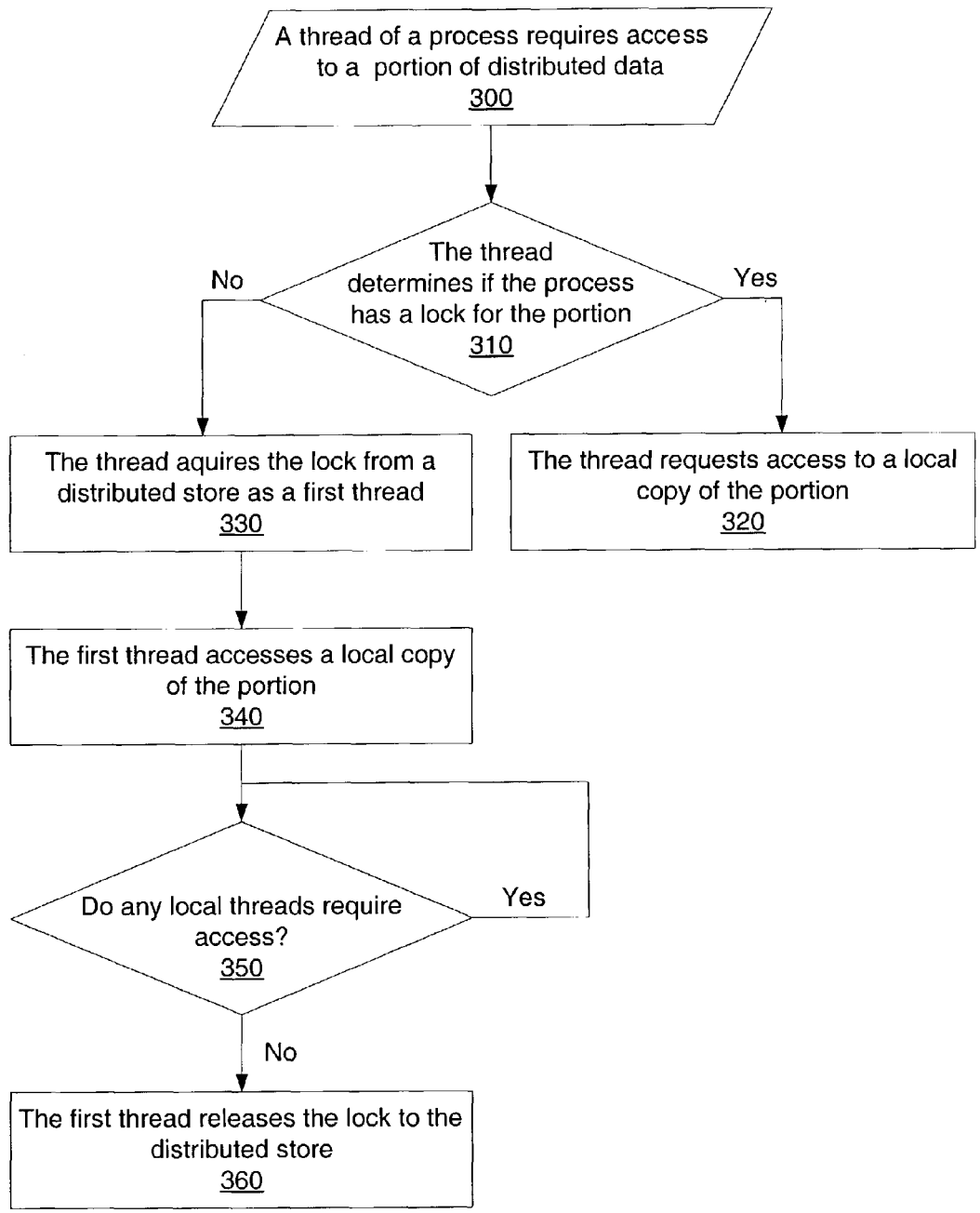
FIG. 4 illustrates one embodiment of a method for providing locked access to distributed data to a multithreaded process in a distributed system in which multiple processes may share access to the distributed data.

FIG. 4 illustrates one embodiment of a method for providing locked access to distributed data to a multithreaded process in a distributed system in which multiple processes may share access to the distributed data. A thread of a process may require access to a portion of distributed data as indicated at 300. The thread may determine whether the process holds a lock for a portion of primary data representing a global instance of the distributed data portion as indicated at 310. In one embodiment, the thread may make a determination by checking with a local data manager of the process. In one embodiment, the local data manager may be a thread of the process dedicated to keeping track of whether the process holds a lock for portions of primary data. In another embodiment, each thread may include a local data manager. In yet another embodiment, the local data manager may be any other thread that has access to the local data.

If the process does hold a lock for the portion of primary data, the thread may request access to a local copy of the portion as indicated at 320. In one embodiment, the process may implement a local locking method. The local locking method may provide locks for portions of local data to threads of the process for local data. In one embodiment, the thread may obtain a lock for a portion of the local data by requesting the lock from the local data manager. If another thread holds the lock, the local data manager may, in one embodiment, buffer the message to grant the lock to the thread if the lock becomes available (e.g. when the other thread releases the lock). If no other thread holds the lock, the local data manager may grant the lock to the thread. While the thread holds the lock for the portion of local data, other threads of the process may not access the portion of local data. In one embodiment, other threads of the process may obtain locks for other portions of local data. The locks providing exclusive access to portions of the local data may help prevent data clobbering within the local data.

If the process does not hold the lock for the portion of primary data, the thread may request the lock on behalf of the process from a distributed store. Since the process did not already own the lock, the thread first acquiring the lock for the portion of primary data may be referred to as the "first thread." If a process is granted the lock, other processes may not access the portion of primary data corresponding to the lock. In one embodiment, if another process holds the lock for the portion of primary data, the first thread's request may be buffered. The first thread may not be granted the lock until the other process releases the lock. For example, the first thread's request may be buffered by the distributed store and the distributed store may respond to the request if the lock becomes available. If no other process holds the lock, the first thread may be granted the lock for the process as indicated at 330.

In one embodiment, the process may read the distributed data portion, to which the first thread requires access, from the corresponding portion of primary data stored on the distributed store to local data, stored local to the process. Threads of the process may access the distributed data portion from the local data. The first thread may access a portion of the local data as indicated at 340. Access to the local data may be provided to the other threads of the process. In one embodiment, the local data manager may provide access to the local data. In another embodiment, the first thread may provide access to the local data. In one embodiment, the process may provide a local locking method as described above.

The first thread may determine whether any local threads require access to the distributed data portion as indicated at 350. In one embodiment, the process may use a counting method to make the determination. A count may be initialized zero if the process does not hold the lock for the portion of primary data. The count may be set to one if the first thread is granted the lock to the to the portion of primary data. Each thread of the process requesting access to the distributed data portion may increment the count.

As each thread of the process finishes accessing the distributed data portion (including the first thread), it may decrement the count. Once the count has been decremented to zero, threads of the process may no longer require access to the distributed data portion.

In one embodiment, if the count is greater than zero, the first thread may determine that one or more local threads require access to the distributed data portion. The first thread may continue to hold the lock for the portion of primary data on behalf of the process. Access to the distributed data portion may continue to be provided to the one or more threads.

In one embodiment, if the count is zero, the first thread may determine that no local threads require access to the distributed data portion. The first thread may release the lock for the portion of primary data for the process as indicated at 360. In one embodiment, threads of the process may have modified portions of the local data. If the lock is released, the portion of primary data may be updated with the local data.

In one embodiment, a thread of the process may send an invalidate request requesting the release of the lock to the first thread. In one embodiment, for example, the distributed data portion may represent session data for a client session of an enterprise server. The session may have a predetermined length of time to live, or the session may expire in response to events (e.g. inactivity of a client or a request from a client). In one embodiment, if the session has expired, processes may be required to release locks for distributed data portion(s) for the expired session. In embodiments, the distributed data portion may include the session's time to live and/or an indication that a session expiration event has occurred. A thread of the process accessing the session data may determine that the session has expired by accessing the time to live or the indicator of session expiration included in the distributed data portion. The thread may send an invalidate request to the first thread in response to the determination. In other embodiments, the distributed data portion may include other data besides session data. There may be other conditions reflected within the data (e.g. of data inconsistency and/or a transaction rollback) to which a thread may respond by issuing an invalidate request. The first thread may release the lock on behalf of the process in response to the invalidate request and notify the requesting thread of release of the lock. In one embodiment, the process may implement a method for prioritizing tasks (e.g. allowing a thread access to distributed data and/or releasing a lock). For example, the invalidate request may have a lower or higher priority than providing access to distributed data portion(s) to one or more threads. The first thread may not release the lock in response to the invalidate response until the one or more threads finish accessing the distributed data portion.

In one embodiment, if the lock for the portion of primary data is released, the distributed store may update the portion of primary data with the local data of the process. In embodiments, the process or a system hosting the process may provide the local data to the distributed store. In one embodiment, only the modified portions of the local data may be provided and used to update the primary data to help conserver resources (e.g. network bandwidth). In another embodiment, all the local data may be used to update the primary data. In still yet another embodiment, the distributed store may update the primary data periodically. For example, the distributed store may update primary data when network traffic is at a minimum instead of at lock release.

In one embodiment, the distributed store may require that only a thread granted a lock for a process may release the lock for the process. The first thread may remain executing within the process, as described above, to meet this requirement. In one embodiment, the first thread may finish the tasks for which it required access to the distributed data portion. The first thread may not terminate immediately after finishing, however. In one embodiment, the first thread may provide access to the distributed data portion to the other threads of the process (e.g. as the local data manager). In embodiments, the first thread may release the lock on behalf of the process in response to determining that no more threads require access to the distributed data portion or in response to an invalidate request.

Figure 5A:
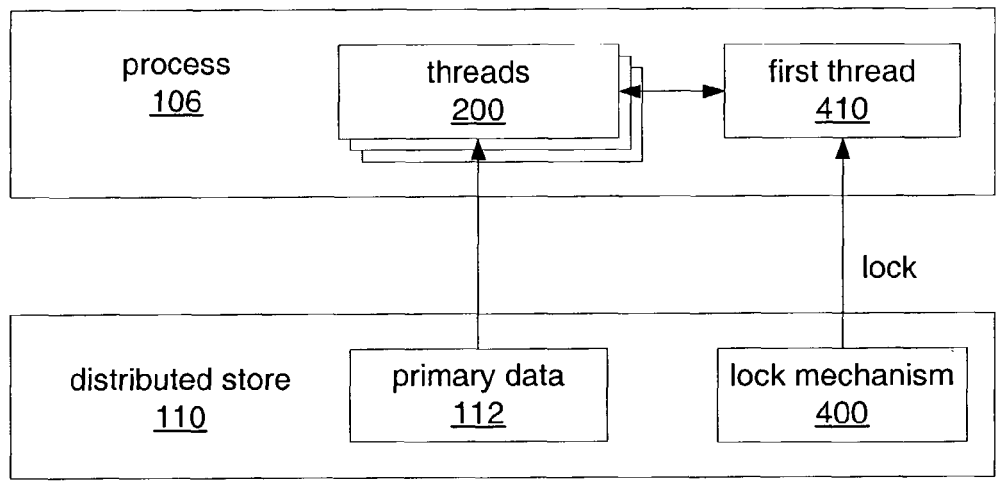
FIGS. 5A and 5B illustrate another embodiment of providing locked access to distributed data to a multithreaded process in a distributed system in which multiple processes may share access to the distributed data.
Figure 5B:
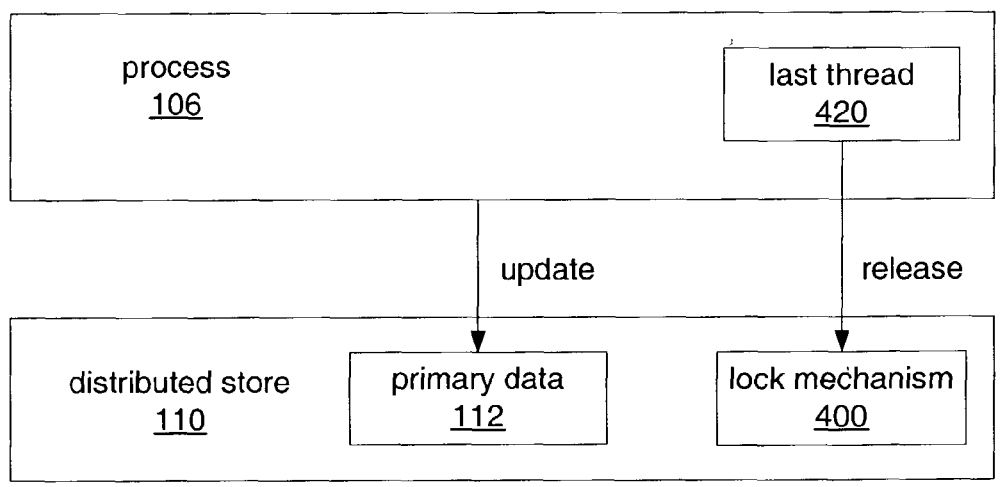

FIGS. 5A and 5B illustrate another embodiment of providing locked access to distributed data to a multithreaded process in a distributed system in which multiple processes may share access to the distributed data, such as the system of FIG. 1. In FIG. 5A, lock mechanism 400 may grant a lock for a portion of primary data 112 to first thread 410 of process 106 in a manner similar to that described above for FIG. 3A.

In one embodiment, lock mechanism 400 may allow any thread of a process holding a lock to release the lock. In one embodiment, after first thread 410 has finished accessing the distributed data portion, first thread 410 may terminate execution since any other thread of process 106 may release the lock later. In another embodiment, first thread 410 may provide services to other threads of process 106 after finishing accessing the distributed data portion. For example, first thread 410 may serve as a local data manager and/or a count mechanism similar to those described above for FIGS. 3B-3C.

One or more other threads may access the distributed data portion. In one embodiment, process 106 may include a local data manager (as described above for FIG. 3B) to determine whether any threads require access to the distributed data portion. In one embodiment, first thread 410 may serve at the local data manager. In another embodiment, first thread 410 may have terminated execution and another thread of process 106 may be the local data manager. The local data manager may keep track of the threads 200 currently requiring access to the distributed data portion. Eventually, there may be only one thread 200 left requiring access to the distributed data portion. Other threads 200 requiring access to the distributed data portion may have finished accessing the distributed data portion.

If no more local threads require access to the distributed data portion, the lock for the portion of primary data may be released for process 106. Since no other threads of process 106 may access the distributed data portion once the lock is released until the lock is granted to process 106 again, there may be a thread of process 106 to last access the distributed data portion before the lock is released. The thread 200 to last access the distributed data portion may be referred to as the "last thread."

In FIG. 5B, last thread 420 indicates the last thread 106 to last access the distributed data before the lock is released. In one embodiment, there may be other threads executing within process 106 that may not need access to the distributed data portion. In one embodiment, a local data manager may determine whether last thread 420 has finished accessing the distributed data portion and no other threads have pending requests for the distributed data portion. In one embodiment, to make the determination, process 106 may implement a count mechanism as described above for FIG. 3C. If the count reaches zero, there may be no more local threads requiring access to the distributed data portion. In one embodiment, if the count reaches zero, the local data manager may request that last thread 420, the last thread to require access to the distributed data portion, release the lock. In one embodiment, if a process is granted a lock for a portion of primary data, lock mechanism 400 may allow any thread of the process to release the lock for the process. Last thread 420 may release the lock on behalf of process 106 in response to the request from the local data manager.

In one embodiment, last thread 420 may release the lock for primary data 112 while other threads 200 still require access to the distributed data portion, such as in response to an invalidate request. For example, the portion of primary data 112 may represent a client session of the multi-tiered enterprise system. The client session may end (i.e. expire). For example, the client may remain inactive and/or unresponsive for a period of time. The enterprise application may require that, if the client session expires, locks for primary data 112 representing the client session be released. In one embodiment, last thread 420 may have access to a value indicating whether a session has expired (e.g. the value may be included in the distributed data portion). In another embodiment, the session expiration may trigger an event that may notify last thread 420 that the session has expired. Thus, last thread 420 may be whichever thread releases the lock. For example, last thread 420 that releases the lock may be the thread that receives an invalidate or lock release request, or lat thread 420 mat be the last thread to access the distributed data portion when no more threads in the process are requesting access to the same distributed data portion.

In one embodiment, process 106 may implement a priority system that may assign priorities to requests to access the distributed data portion(s) and requests to release the lock. Requests to release the lock may receive a lower or higher priority than one or more requests to access the distributed data portion. In one embodiment, last thread 420 may be required to request permission to release the lock by the priority system. The priority system may notify last thread 420 when release of the lock has priority and may be performed. One or more threads may access the distributed data portion before last thread 420 may release the lock. Last thread 420 may release the lock for the portion of primary data 112 for process 106 after higher priority activities finish.

In one embodiment, if the lock for the portion of primary data 112 is released, primary data 112 may be updated with the local data accessed by threads 200 of process 106. In one embodiment, only the modified portions of the local data may be used to update primary data 112. In another embodiment, all the local data may be used to update primary data 112. In still yet another embodiment, distributed store 110 may update primary data 112 periodically. For example, distributed store 110 may update primary data 112 when network traffic is at a minimum.

In one embodiment, lock mechanism 400 may not require that the same thread that is granted a lock for a process must release the lock for the process. Thus, instead of a first thread that initially acquired the lock for its process 106 being the thread to release the lock for the portion of primary data 112, last thread 420 may release the lock. Last thread 420 may be the thread that is most convenient to release the lock, such as the last thread in process 106 that accesses the data portion. For example, if a thread finishing its access of a distributed data portion locked for its process 106 determines that no more threads of process 106 require access to the distributed data portion, the thread may release the lock as last thread 420.

Figure 6:
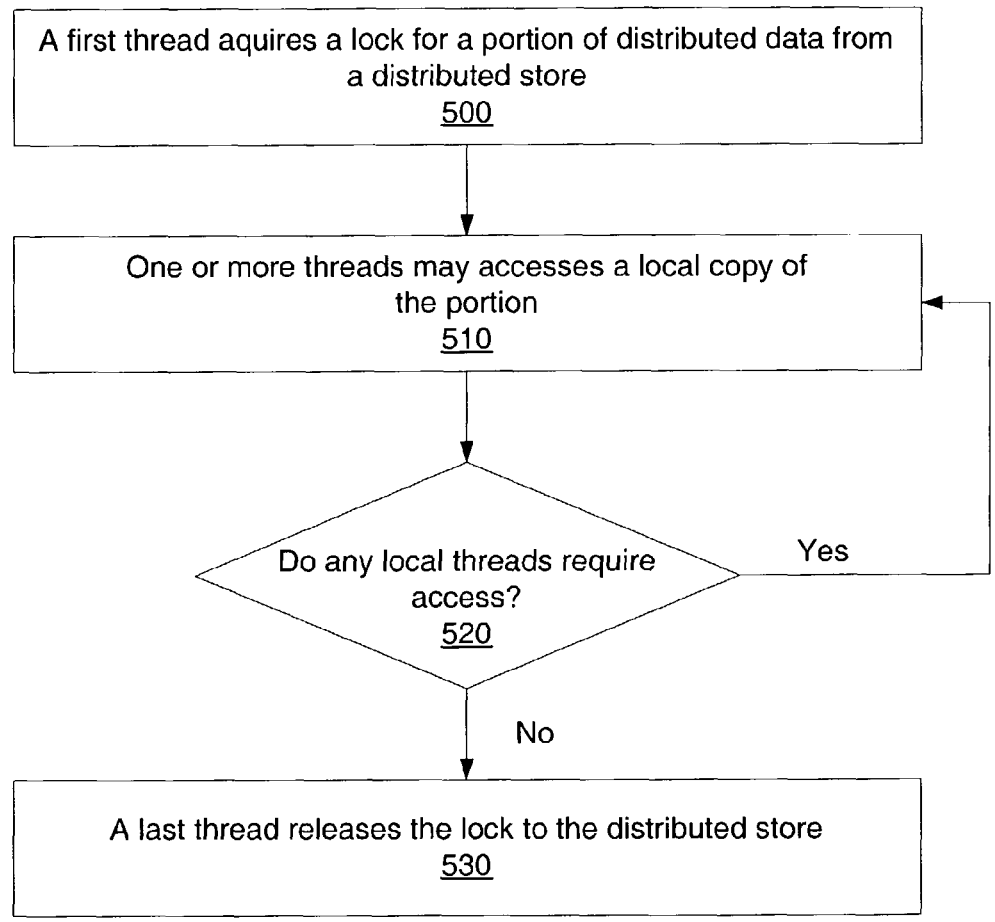
FIG. 6 illustrates another embodiment of a method for providing locked access to distributed data to a multithreaded process in a distributed system in which multiple processes may share access to the distributed data.

FIG. 6 illustrates another embodiment of a method for providing locked access to distributed data to a multithreaded process in a distributed system in which multiple processes may share access to the distributed data. A first thread of a process may obtain a lock for a portion of primary data representing a global instance of a portion of distributed data as indicated at 500. In one embodiment, obtaining a lock for a portion of primary data may be similar to the method described above for 300-330 of FIG. 3.

In one embodiment, after obtaining the lock for the process and accessing the distributed data, the first thread may terminate execution. In one embodiment, the first thread may terminate execution before the lock is released for the process. In another embodiment, the first thread may continue executing while the process holds the lock. For example, the first thread may manage access to local data representing a local instance of the distributed data portion for other threads of the process.

One or more threads of the process may access portions of the local data as indicated at 510. In one embodiment, a thread-level locking method as described for FIG. 4 may be implemented to grant exclusive access to a portion of the local data to a thread. In one embodiment, the first thread may implement the thread-level locking method. In another embodiment, another thread of the process may manage access to the local data. In yet another embodiment, each thread of the process requiring access to the distributed data may manage access to the local data. For example, each thread may cooperate to pass a token granting access to a portion of the local data from a thread no longer requiring access to the portion of the local data to a thread still requiring access to the portion of the local data.

The process may determine whether any local threads require access to the distributed data portion as indicated at 520. In one embodiment, the process may use a counting method similar to that described above for FIG. 4. In another embodiment, the process may use another method. If the process determines that any local threads require access to the distributed data portion, the process may continue to hold the lock. If the process determines that no local threads require access to the distributed data portion, in one embodiment, the process may release the lock. In another embodiment, the process may retain the lock until requested to release the lock.

In one embodiment, if a process is granted a lock for a portion of primary data, any thread of the process may release the lock. If no threads of the process require access to the distributed data portion, a last thread to finish accessing the distributed data portion may release the lock for the primary data portion for the process as indicated at 530. Since this thread is the last thread to access the distributed data portion, it may be referred to as the "last thread." In one embodiment, if the lock for the portion of primary data is released, the distributed store may update the primary data portion with the local data of the process as describe above for FIG. 4.

In one embodiment, a thread of the process may release the lock on behalf of the process regardless of whether any threads of the process require access to the distributed data portion. In one embodiment, for example, since any thread of the process may release the lock on behalf of the process, a thread receiving an invalidate request may release the lock. In another embodiment, the thread may issue an invalidate notice to a local data manager and release the lock. In one embodiment, the process may implement a method for prioritizing tasks (e.g. allowing a thread access to distributed data and/or releasing a lock).

For example, the invalidate request may have a lower or higher priority than providing access to the distributed data portion to one or more threads. In one embodiment, in response to the invalidate request, a local data manager may notify the thread if the invalidate request has priority, and the thread may release the lock on behalf of the process in response to the notification of priority.

In one embodiment, for example, the distributed data portion may represent session data for a client session of an enterprise server. The session may have a predetermined length of time to live, or the session may expire in response to events (e.g. inactivity of a client or a request from a client). In one embodiment, if the session has expired, processes may be required to release locks for distributed data portions for the expired session. In embodiments, the distributed data portion may include the session's time to live and/or an indication that a session expiration event has occurred. A thread of the process accessing the session data may determine that the session has expired by accessing the time to live or the indicator of session expiration included in the distributed data portion. In other embodiments, the distributed data portion may include other data besides session data. There may be other conditions reflected within the data (e.g. of data inconsistency and/or a transaction rollback) to which a thread may respond by issuing an invalidate request. The thread may send an invalidate request to the local data manager in response to the determination.

Figure 7:
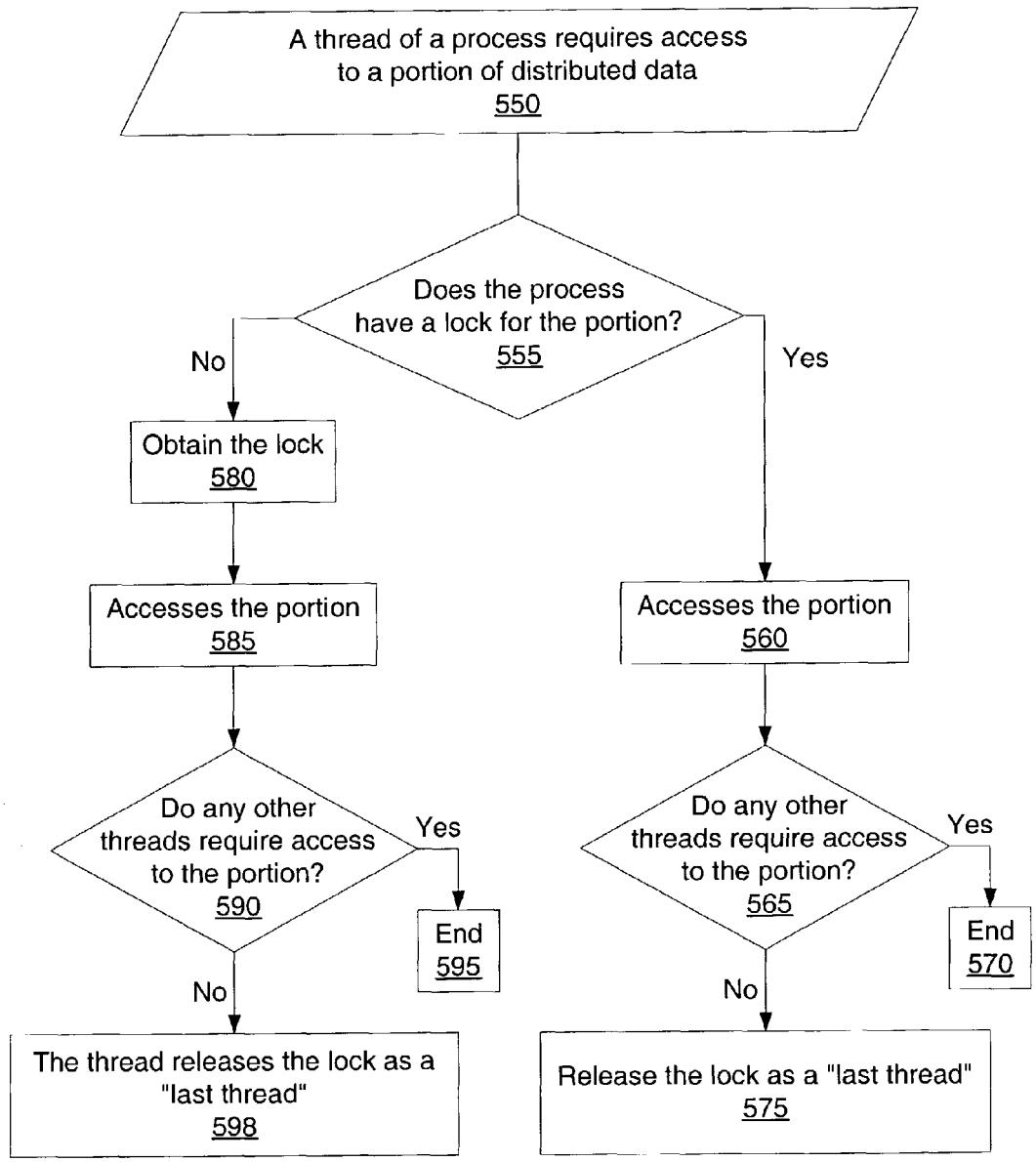
FIG. 7 illustrates another embodiment of a method for providing locked access to distributed data to a multithreaded process in a distributed system in which multiple processes may share access to the distributed data.

FIG. 7 illustrates another embodiment of a method for providing locked access to distributed data to a multithreaded process in a distributed system in which multiple processes may share access to the distributed data. A thread of a process may require access to a portion of distributed data as indicated at 550. The thread may determine whether the process has a lock for a portion of primary data corresponding to the portion of distributed data as indicated at 555. In one embodiment, to make the determination, the thread may request access to the portion of distributed data from a local data manager as described above.

If the thread determines that the process has a lock for the primary data portion, the thread may access a local data portion corresponding to the distributed data portion as indicated at 560. In one embodiment, the thread may request a local lock for the local data portion from a local data manager. If the local lock is held by another thread, the thread may not receive the local lock for the portion of local data until the other thread releases the local lock. If the lock is not held by another thread, the local data manager may grant the lock to the thread. The thread may complete accessing the portion of local data.

In one embodiment, if the thread requests access to the distributed data portion, the thread may notify a mechanism keeping track of whether threads of the process require access to the distributed data portion (e.g. the local data manager as described above for FIG. 3C). In one embodiment, for example, the thread may increment a count if the thread requests access to the distributed data portion. The thread may decrement the count if the thread finishes accessing the distributed data.

The thread may determine whether any other threads of the process require access to the portion of distributed data as indicated at 565. In one embodiment, to determine whether any other threads of the process require access to the distributed data portion, the thread may check the count. In another embodiment, the thread may communicate with the local data manager. In still yet another embodiment, the local data manager may notify the thread if no more other threads of the process require access to the distributed data, and the thread may assume that other threads of the process require access if the thread is not notified otherwise. If the thread determines that other threads of the process require access to the portion of distributed data, the thread may complete accessing the local data portion as indicated at 570. In one embodiment, the thread may release the local lock for the local data portion. Other threads of the process may request access to the local data portion. In one embodiment, the other threads may request locks for portions of local data. If the thread determines that no more threads require access to the portion of distributed data, the thread may release the lock as the "last thread" on behalf of the process as indicated at 575.

In one embodiment, the thread may release the lock regardless of whether other threads of the process require access to the distributed data portion. In one embodiment, for example, the thread may send an invalidate request to the local data manager as described above. In one embodiment, the process may implement a priority system and the invalidate request may be assigned a priority as described above. For example, access to the distributed data portion by one or more threads may be granted priority over the invalidate request. The one or more threads may access the distributed data portion before the lock for the distributed data portion is released in response to the invalidate request.

If the thread determines that the process does not hold the lock for the primary data portion, the thread may obtain the lock for the corresponding portion of primary data as indicated at 580. The remaining method as indicated at 585-598 is substantially similar to that indicated at 560-575 as described above.

Figure 8A:
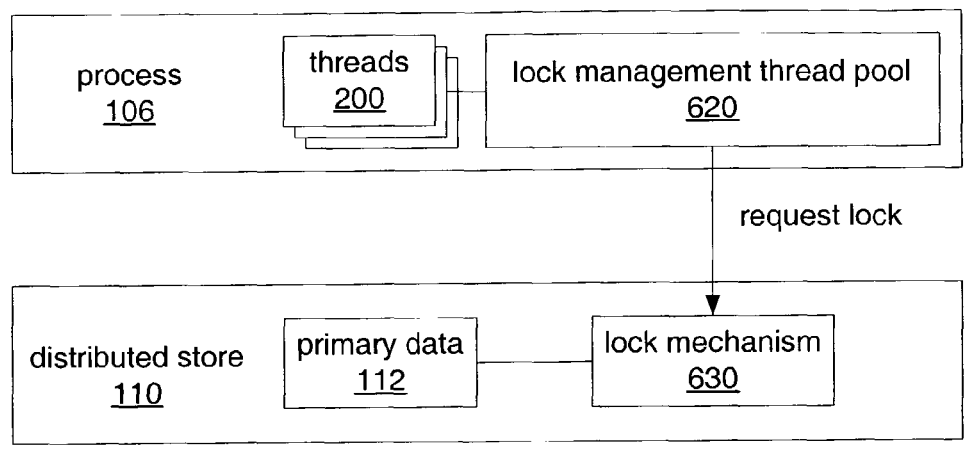
FIGS. 8A-8C illustrate yet another embodiment of providing locked access to distributed data to a multithreaded process in a distributed system in which multiple processes may share access to the distributed data.
Figure 8B:
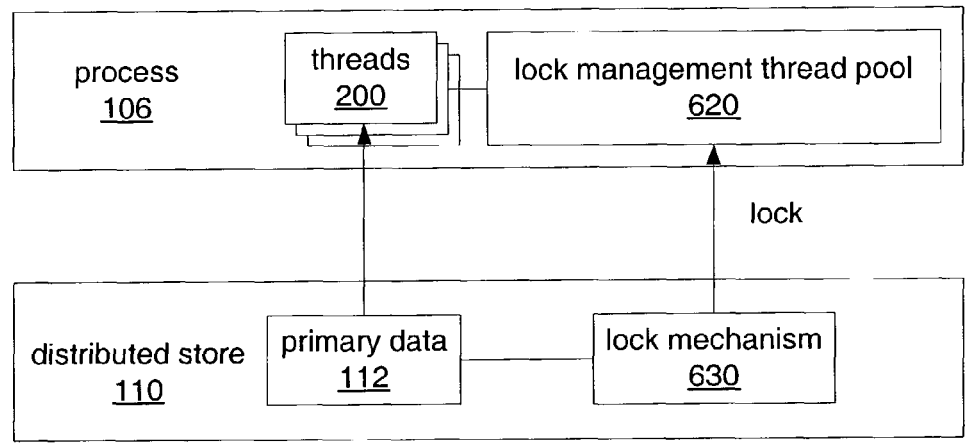
Figure 8C:
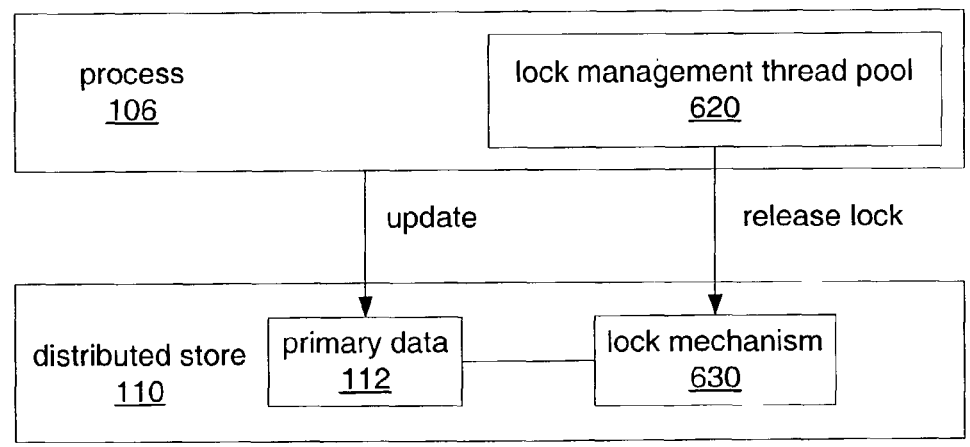

FIGS. 8A-8C illustrate yet another embodiment of providing locked access to distributed data to a multithreaded process in a distributed system in which multiple processes may share access to the distributed data, such as the system of FIG. 1. In one embodiment, primary data 112 may include a plurality of portions of distributed data. In one embodiment, for example, each portion may represent a state of a client session for a client of the multi-tiered enterprise application. In another embodiment, each portion may include distributed data other than state data and may not necessarily include state data. A lock mechanism 630 may be associated with distributed store 110 for controlling access to primary data 112. Lock mechanism 630 may grant locks for each of the portions. In one embodiment, only a holder of a lock may have access to a primary data portion corresponding to the lock.

Threads 200 of process 106 may require access to a portion of distributed data. A thread 200 may check whether process 106 holds a lock for a portion of primary data 112 that represents a global instance of the distributed data portion. In one embodiment, process 106 may include a local data manager. The local data manager may keep track of locks for portions of primary data 112 currently held by process 106. The thread 200 desiring access to the data may check with the local data manager to determine whether process 106 holds a lock for the portion of primary data 112. If process 106 holds a lock for the portion of primary data 112, the thread 200 may access a portion of local data that represents a local instance of the distributed data portion.

If process 106 does not have a lock for the portion of primary data 112, a thread of lock management thread pool 620, henceforth referred to as the lock management thread, may request a lock for the portion from lock mechanism 630 for process 106. In embodiments, lock management thread pool 620 may a plurality of threads each dedicated to locking and/or unlocking portions of primary data 112 on behalf of process 106. Whenever process 106 needs a lock for a portion of primary data 112, a thread from lock management thread pool 620 is selected to acquire the lock. Lock management thread pool 620 may hold one or more locks for portions of primary data 112 on behalf of process 106 at any given time.

In FIG. 8A, the lock management thread may request a lock for the portion of primary data 112 from lock mechanism 630. In FIG. 8B, lock mechanism 630 may grant the lock for the portion of primary data 112 to the lock management thread. The lock management thread may acquire the lock on behalf of process 106 so that access to portions of local data representing a local instance of the distributed data may be provided to the one or more threads 200. In one embodiment, the local data manager may manage access to the local data. In one embodiment, the local data manager may implement a thread-level locking mechanism for portions or all of the local data as described above for FIG. 3B. In one embodiment, the lock management thread may be the local data manager. In another embodiment, another thread of lock management thread pool 620 may be the local data manager. In yet another embodiment, a thread not included within lock management thread pool 620 may be the local data manager.

After being granted the lock, the lock management thread may remain alive (e.g. in a wait state) until time to release the lock. In one embodiment, the lock management thread may perform local data management (e.g. keeping a count of threads requiring access to the distributed data and/or managing thread-level locking) until the lock is released. One or more threads 200 may access portions of the distributed data while process 106 holds the lock.

In FIG. 8C, the lock management thread may release the lock for the portion of primary data 112 if no more threads of process 106 require access to the portion of the distributed data. In one embodiment, the lock management thread may determine whether no more threads of process 106 require access to the portion of the distributed data. In another embodiment, the local data manager or another thread of process 106 may notify the lock management thread that no more threads require access to the portion of the distributed data.

In one embodiment, for example, process 106 may include a count for determining whether threads of process 106 require access to the portion of the distributed data as described for FIG. 3C. The lock management thread may obtain the lock and increment the count. In embodiments, each thread requiring access to the portion of the distributed data may be configured to increment the count if the particular thread requests access to the portion of the distributed data and/or decrement the count if the particular thread finishes accessing the portion of the distributed data. In other embodiments, the local data manager may increment the count for each thread that requires access to the portion of the distributed data and/or decrement the count for each thread that finishes accessing the portion of the distributed data. In yet another embodiment, the lock management thread may increment and decrement the count.

As a result of the count being decremented for each thread that finishes accessing the portion of the distributed data, the count may take the value of zero if no threads of process 106 require access to the portion of the distributed data. In embodiments, the value of count may be checked at every increment and/or decrement (e.g. by the local data manager or the lock management thread). In another embodiment, the value of count may be checked periodically (e.g. by the local data manager or the lock management thread). In still yet other embodiments, the count reaching zero may trigger an event that may notify the lock management thread or the local data manager that there are no more threads requiring access to the portion of the distributed data. In one embodiment, for example, the local data manager may check the count. The local data manager may determine that the count is zero. The local data manager may notify the lock management thread (or the lock management thread may be the local data manager in embodiments). If the count is zero, the lock management thread may determine that no more threads of process 106 require access to the portion of the distributed data.

In one embodiment, lock mechanism 630 may require that the same thread that is granted a lock for a portion of primary data 112 for a process must release the lock for the process. The lock management thread that acquires a lock may remain executing within process 106 to release the same lock for the portion of primary data 112. If the lock management thread determines that no more threads of process 106 require access to the distributed data, the lock management thread may release the lock for the portion of primary data 112 on behalf of process 106. In another embodiment, lock mechanism 630 may not require that the same thread that is granted a lock for primary data 112 for a process must release the lock for the process.

In embodiments, threads 200 may be configured to send invalidate requests to the local data manager or the lock management thread that request release of the lock for the portion of primary data 112. In one embodiment, one of the threads 200 may send an invalidate request to the lock management thread to release the lock for the portion. For example, the portion may represent a client session of the multi-tiered enterprise application. The client session may end (i.e. expire). For example, the client may remain inactive and/or unresponsive for a period of time. The enterprise application may require that, if the client session expires, locks for portions of primary data 112 representing the client session be released. In one embodiment, a thread 200 of process 106 may have access to a value indicating whether a session has expired (e.g. the value may be included in the portion of the distributed data). In another embodiment, the session expiration may trigger an event that may notify the thread 200 that the session has expired.

The thread 200 of process 106 may send an invalidate request to release the lock for the portion of primary data 112 for process 106 even if the count is nonzero in response to the session expiration. The lock management thread may receive the invalidate request. In embodiments, the local data manager or the lock management thread may implement a priority system for requests to access the portions of the local data and invalidate requests from the threads 200. The invalidate request may receive a lower or higher priority than one or more requests to access the portions of the local data. One or more threads may access the portions of the local data before the lock management thread or the local data manager respond to the invalidate request. The lock management thread may release the lock for the portion of primary data 112 for process 106 in response to the invalidate request after higher priority requests are dealt with. In one embodiment, the lock management thread may notify the requesting thread 200 that the lock has been released.

Figure 9:
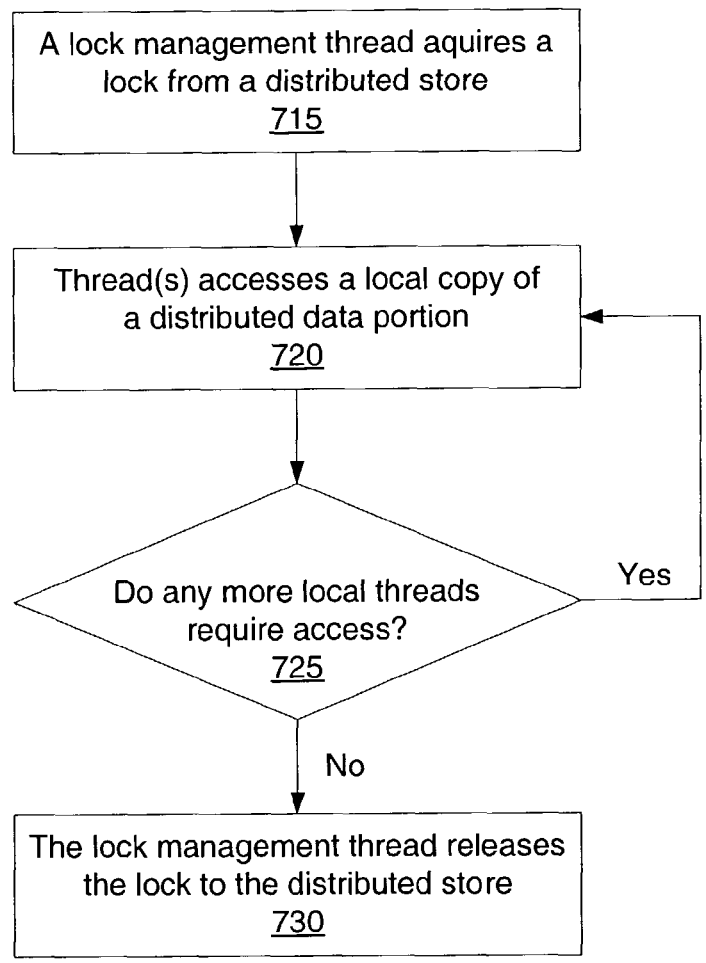
FIG. 9 illustrates yet another embodiment of a method for providing locked access to distributed data to a multithreaded process in a distributed system in which multiple processes may share access to the distributed data.

FIG. 9 illustrates yet another embodiment of a method for providing locked access to distributed data to a multithreaded process in a distributed system in which multiple processes may share access to the distributed data. A thread of a process may require access to a portion of distributed data. The thread may determine whether the process holds a lock for a portion of primary data representing a global instance of the portion of distributed data. In one embodiment, the thread may make a determination by checking with a local data manager of the process. In one embodiment, the local data manager may be a thread of the process dedicated to keeping track of whether the process holds a lock for portions of primary data. In another embodiment, each thread may include a local data manager. In yet another embodiment, the local data manager may be any other thread that has access to the local data.

If the process does hold a lock for the portion of primary data, the thread may request access to a local copy of the portion. In one embodiment, the process may implement a local locking method as described above for FIG. 4. The local locking method may provide locks for portions of local data to threads of the process. While a thread of the process holds the lock for the portion of local data, other threads of the process may not access the portion of local data.

In one embodiment, the process may include a lock management thread pool. The lock management thread pool may include a plurality of threads each dedicated to obtaining and/or releasing a lock for a portion of the primary data. If the process does not hold the lock for the portion of the primary data, a lock management thread of the lock management thread pool may request the lock for the portion of the primary data on behalf of the process. In one embodiment, the thread requiring access to the portion of the distributed data may request that the lock management thread obtain the lock. In another embodiment, the local data manager may request that the lock management thread obtain the lock in response to a query from the thread. If the process is granted the lock, other processes may not access the portion of primary data corresponding to the lock. In one embodiment, if another process holds the lock for the portion of primary data, the lock management thread's request may be buffered. The lock management thread may not be granted the lock until the other process releases the lock. For example, the lock management thread's request may be buffered by the distributed store and the distributed store may respond to the request if the lock becomes available. If no other process holds the lock, the first thread may be granted the lock for the process as indicated at 715.

In one embodiment, the process may read the portion of primary data from the distributed store to local data (stored local to the process). Access to the local data may be provided to the other threads of the process. In one embodiment, the local data manager may provide access to the local data. In another embodiment, the lock management thread may provide access to the local data. In one embodiment, the process may provide a local locking method as described above. Threads of the process may access the portion of the distributed data from the local data as indicated at 720.

The lock management thread may determine whether any local threads require access to the portion of the distributed data as indicated at 725. In one embodiment, the process may use a counting method to make the determination as described above. A count may be initialized zero if the process does not hold the lock for the portion of the primary data. The count may be set to one if the lock management thread is granted the lock to the to the portion of the primary data. The count may be incremented for each thread of the process requesting access to the portion of the distributed data. The count may be decremented for each thread of the process that finishes accessing the portion of the distributed data. In one embodiment, the local data manager may increment and decrement the count. In another embodiment, the lock management thread may increment and decrement the count. In yet another embodiment, another thread of the lock management thread pool may increment and decrement the count. In still yet another embodiment, each thread of the process may increment or decrement the count according to whether the particular thread is requesting access to the portion of the distributed data or finishing accessing the portion of the distributed data respectively. Once the count has been decremented to zero, threads of the process may no longer require access to the portion of the distributed data.

In one embodiment, if the count is greater than zero, the lock management thread may determine that one or more local threads require access to the portion of the distributed data. The lock management thread may continue to hold the lock for the portion of primary data on behalf of the process. Access to the portion of the primary data may continue to be provided to the one or more threads. In one embodiment, if the count is zero, the lock management thread may determine that no local threads require access to the portion of the distributed data. The lock management thread may release the lock for the portion of the primary data on behalf of the process as indicated at 730. In one embodiment, threads of the process may have modified portions of the local data. If the lock is released, portions of the primary data may be updated with portions of the local data.

In one embodiment, a thread of the process may send an invalidate request requesting the release of the lock to the lock management thread. In one embodiment, for example, the portion of the distributed data may represent session data for a client session of an enterprise server. The session may have a predetermined length of time to live, or the session may expire in response to events (e.g. inactivity of a client or a request from a client). In one embodiment, if the session has expired, processes may be required to release locks for one or more portions of distributed data representing the expired session. In embodiments, the distributed data may include the session's time to live and/or an indication that a session expiration event has occurred. A thread of the process accessing the session data may determine that the session has expired by accessing the time to live or the indicator of session expiration included in the portion of the distributed data. In other embodiments, the portion of the distributed data may include other data besides session data. There may be other conditions reflected within the portion of the distributed data (e.g. of data inconsistency and/or a transaction rollback) to which a thread may respond by issuing an invalidate request. The thread may send an invalidate request to the lock management thread in response to the determination. The lock management thread may release the lock on behalf of the process in response to the invalidate request and notify the requesting thread of release of the lock. In one embodiment, the process may implement a method for prioritizing tasks (e.g. allowing a thread access to distributed data portions and/or releasing a lock). For example, the invalidate request may have a lower priority than providing access to the portion of the distributed data to one or more threads. The lock management thread may not release the lock in response to the invalidate response until the one or more threads finish accessing the portion of the distributed data.

In one embodiment, the distributed store may require that only a thread granted a lock for a process may release the lock for the process. The lock management thread may remain executing within the process to meet this requirement. In one embodiment, the lock management thread may provide access to the portion of the distributed data to the other threads of the process (e.g. as the local data manager). In embodiments, the lock management thread may release the lock on behalf of the process in response to determining that no more threads require access to the portion of the distributed data or in response to an invalidate request.

Figure 10A:
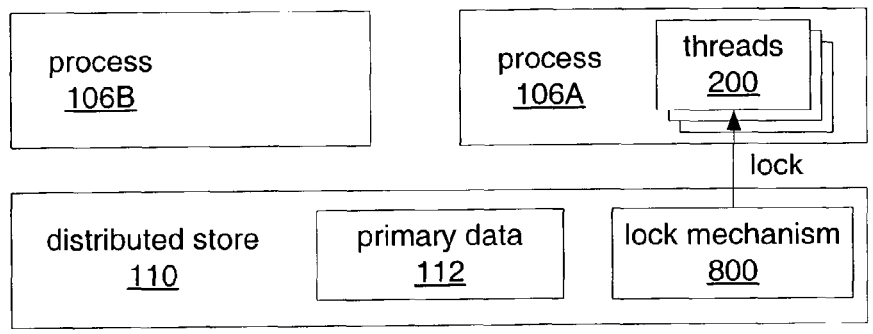
FIGS. 10A-10D illustrate one embodiment of a distributed data system in which a process retains a lock for distributed data until requested to release the lock.
Figure 10B:
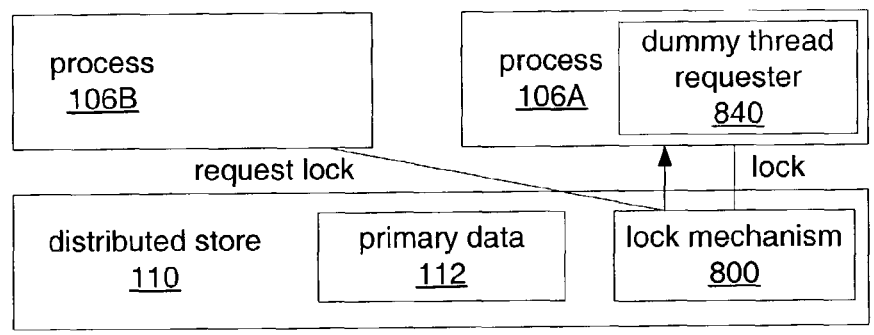
Figure 10C:
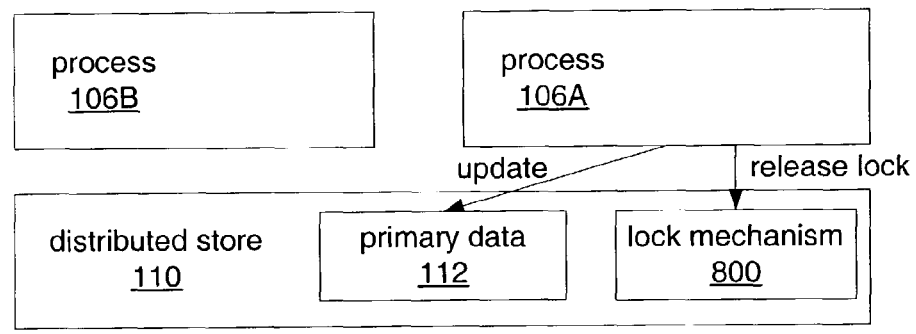

FIGS. 10A-10C illustrate one embodiment of a distributed data system in which a process retains a lock for distributed data until requested to release the lock. In FIG. 10A, process 106A may obtain a lock for a portion of primary data 112 from lock mechanism 800 such as described above by in regard to FIGS. 3-9. Threads 200 of process 106A may access a local instance of a portion of distributed data represented by the portion of primary data 112.

Process 106A may include dummy thread requester 840 for retaining the lock for primary data 112. Process 820 may determine whether any threads require access to the distributed data. Dummy thread requester 840 may act as a thread requiring access to the distributed data, even though, in embodiments, dummy thread requester 840 may or may not actually access data. Dummy thread requester 840 may be initiated to keep a particular lock help by process 106A. Dummy thread requester 840 may act as a requester for the portion of primary data 112 even when no threads of process 106A require access to the portion of primary data 112.

In one embodiment, for example, process 106A may keep a count of local threads requiring access to the portion of the distributed data. Dummy thread requester 840 may be an increment of the count not corresponding to a thread requiring access to the portion of the distributed data. For example, at initialization, the count may be one instead of zero. Upon obtaining a lock for primary data 112, the count may be incremented by each thread of process 106A actually requiring access to the portion of the distributed data. The count may be decremented by threads of the process that only actually required access to the portion of the distributed data, but finished accessing the portion of the distributed data (e.g. finished executing). Thus, after all threads of process 106A are finished accessing the portion of the distributed data, the count may remain at one, and process 106A may not release the lock for the portion of primary data 112.

In another embodiment, for example, dummy thread requester may be a thread requesting access to the portion of the distributed data that may not finish accessing the portion of the distributed data. In one embodiment, for the last example, process 106A may implement a priority system that assigns the lowest priority to dummy thread requester 840's access to the portion of the distributed data. The other threads 200 of process 106A may access the portion of the distributed data while the dummy thread requester 840 waits.

Since dummy thread requester 840 is present, process 106A may determine that there is at least one thread requiring access to the portion of the distributed data. Thus, process 106A may not release the lock for the portion of primary data 112. There may or may not be any threads of process 106A actually requiring access to the portion of the distributed data. Multiple dummy thread requesters 840 may be maintained each for a particular lock for a portion of primary data 112 held by process 106A.

In one embodiment, the last process to use a portion of primary data 112 may be the most likely process to next require access to the portion of primary data 112. If other threads of process 106A subsequently need access to the portion of the distributed data, the lock for the portion of primary data 112 need not be re-obtained from lock mechanism 800 since process 106A may already hold the lock due to dummy thread requester 840. Thus, inclusion of dummy thread requester 840 to retain the lock may help conserve resources (e.g. network bandwidth) used in requesting and granting locks.

In FIG. 10B, process 106B may request access to a portion of primary data 112 locked by process 106A. In response, lock mechanism 800 may request the lock for the portion of primary data 112 from process 106A. In another embodiment, process 106B may request the lock directly from process 106A. In one embodiment, a thread of process 106A may request release of the lock (e.g. the thread may issue an invalidate request). In response to the request, process 106A may cancel dummy thread requester 840 and release the lock.

Figure 10D:
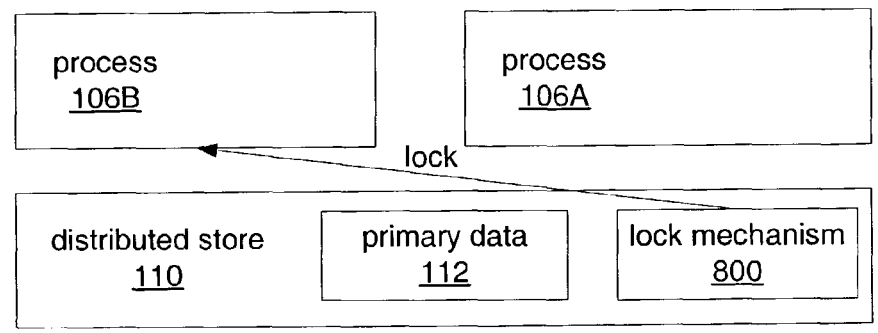

In one embodiment, canceling dummy thread requester 840 may decrement a count indicating if any threads of process 106A require access to the portion of the distributed data. In another embodiment, canceling dummy thread requester 840 may include terminating the execution of a dummy thread requesting access to the portion of the distributed data. In FIG. 10C, process 106A may release the lock for the portion of primary data 112. In FIG. 10D, lock mechanism 800 may then grant the lock for the portion of primary data 112 to process 106B.

Figure 11:
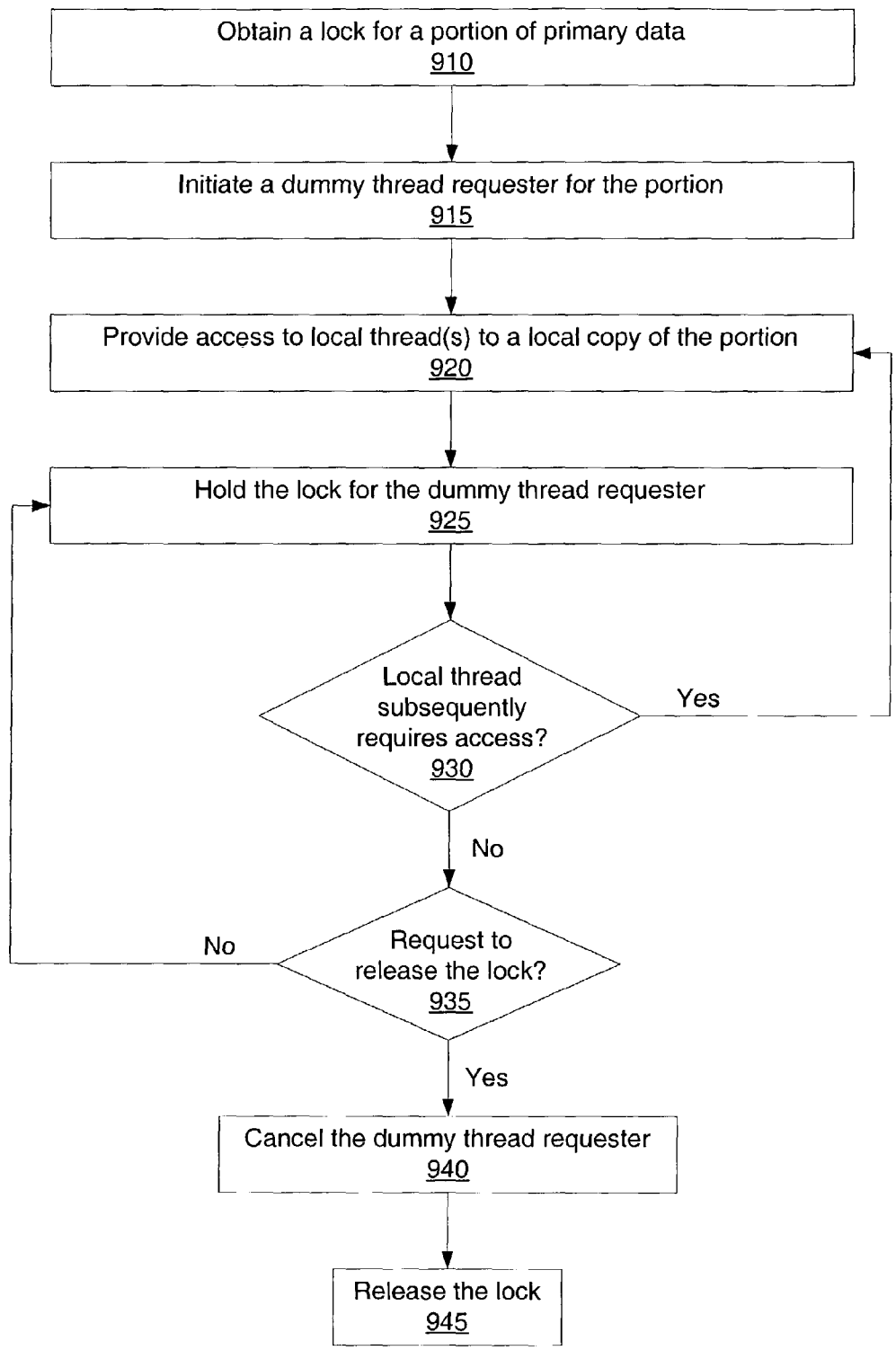
FIG. 11 illustrates one embodiment of a method for holding a lock for primary data for a process until the process is requested to release the lock.

FIG. 11 illustrates one embodiment of a method for holding a lock for primary data for a process until the process is requested to release the lock. Threads of a process may require access to a portion of distributed data. Primary data stored within a distributed store may be a global instance of the distributed data. The process may obtain a lock for a portion of the primary data from a lock mechanism of the distributed store as indicated at 910. In one embodiment, the process may release the lock if the process determines that no more threads require access to the portion of the distributed data. A "dummy" thread requester may indicate that it requires access to distributed data even though, in embodiments, the dummy thread may or may not access to distributed data. Thus, the process may continue to hold the lock for the portion of the primary data. The process may initiate a dummy thread requester as indicated at 915.

In one embodiment, the process may use a counting method to determine whether any local threads require access to the portion of the distributed data, as described above for FIG. 3. The dummy thread requester may be an extra increment of the count. For example, if no threads require access to the portion of the distributed data, the count may be one instead of zero.

In another embodiment, the dummy thread requester may be a thread requesting access to the portion of the distributed data that may not finish accessing the portion of the distributed data. In one embodiment, the process may implement a priority system that assigns the lowest priority to dummy thread requester's access to the portion of the distributed data. The other threads of the process may access the portion of the distributed data while the dummy thread requester waits.

Since the dummy thread requester is present, the process may determine that there is at least one local thread requiring access to the portion of the distributed data. Thus, the process may not release the lock for the portion of the primary data. There may or may not be any threads of the process actually requiring access to the portion of the distributed data. Multiple dummy thread requesters may be maintained each for a particular lock for a portion of the primary data held by the process.

The process may provide access to local data representing an instance of the portion of the distributed data to local threads as indicated at 920. Threads of the process may finish accessing the distributed data, and no more threads may currently require access to the distributed data. The process may hold the lock for the portion of the primary data for the dummy thread requester as indicated at 925. The process may determine whether other threads requiring access to the portion of distributed data have subsequently been initiated as indicated at 930. If other threads requiring access to the portion of distributed data have been initiated, the process may not be required to obtain the lock for the primary data to provide access to the portion of the distributed data to the other threads. The process may already hold the lock for the dummy thread requester. In one embodiment, by holding the lock between the execution of threads requiring access to distributed data, the process may help reduce resources (e.g.

network resources, processing resources) associated with requesting locks, granting locks, and releasing locks. In one embodiment, the last process to use a portion of the primary data may be the most likely process to next require access to the portion of the primary data.

The process may determine whether it has received a request to release the lock as indicated at 935. Other processes may request the lock from the lock mechanism. In one embodiment, the lock mechanism may request that the process release the lock for the distributed data in response to requests for the lock from the other processes. In one embodiment, a thread of the process may request release of the lock. In one embodiment, for example, a thread may issue an invalidate request as described above.

If the process has not received a request to release the lock, the process may continue to hold the lock. If the process has received a request to release the lock, the process may cancel the dummy thread requester as indicated at 940. In one embodiment, for example, canceling the dummy thread requester may include decrementing the count. In another embodiment, canceling the dummy thread requester may include terminating the execution of a lowest priority "dummy" thread. The dummy thread requester may no longer indicate that at least one thread of the process requires access to the portion of the distributed data. When no more other threads of the process require access to the portion of the distributed data, the process may release the lock as indicated at 945.

Figure 12:
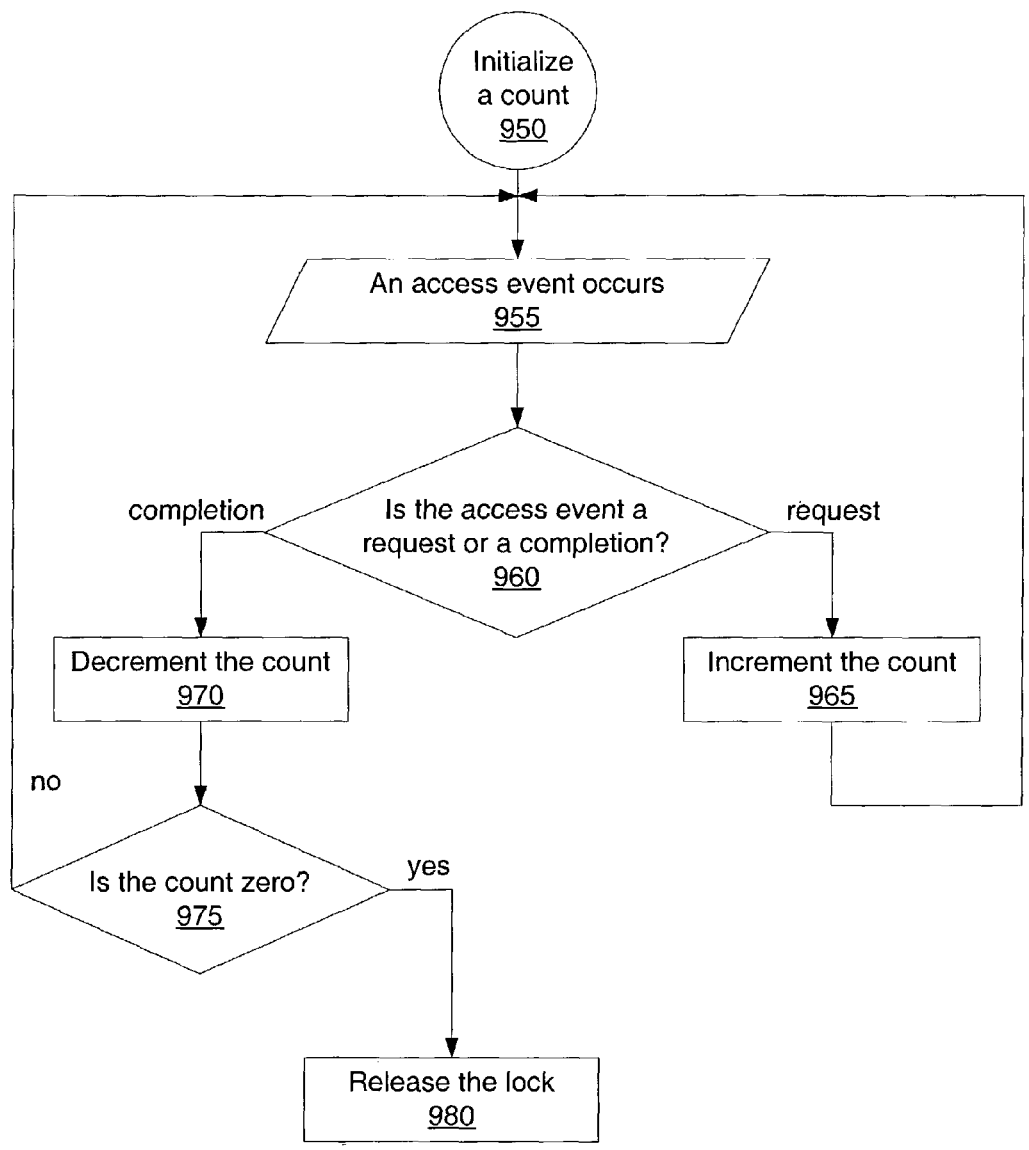
FIG. 12 illustrates one embodiment of a method for determining whether any threads of a process require access to the distributed data.

FIG. 12 illustrates one embodiment of a method for determining whether any threads of a process require access to the distributed data. A process may include a reference count for determining whether to release a lock for a portion of distributed data. The process may initialize the count to zero as indicated at 950. The process may obtain a lock for a portion of the distributed data from a lock mechanism by various techniques such as those described above in regard to FIGS. 3-9.

In one embodiment, access events may include a thread of the process requiring access to the portion of the distributed data and a thread of the process finishing accessing the portion of distributed data. The process may detect an access event as indicated at 955. In one embodiment, the process may include a thread dedicated to detecting access events (e.g. in one embodiment, a local data manager as described above). In one embodiment, each thread carrying out an access event may notify the dedicated thread. In another embodiment, each access event may trigger the notification of the dedicated thread. In yet another embodiment, each thread may handle its own access events.

The process may determine if the access event is a request for access to the portion of the distributed data, or if the access event is a completion of accessing the portion of the distributed data as indicated at 960. If a thread requests access to the portion of the distributed data, the count may be incremented as indicated at 965. If the thread finishes accessing the portion of the distributed data, the count may be decremented as indicated at 970. For example, the thread may have finished executing. In embodiments, each thread requiring access to the distributed data may be configured to increment and/or decrement the count. In other embodiments, the dedicated thread may receive requests from other threads of the process to increment and/or decrement the count. The count may be greater than zero if any threads of the process require access to the portion of the distributed data. The count may be zero if no threads of the process require access to the portion of the distributed data.

The count may be checked as indicated at 975. In embodiments, the count may be checked at every increment and/or decrement. In another embodiment, the count may be checked periodically. In one embodiment, the dedicated thread may check the count. If the count is zero, the lock for the portion of the distributed data may be released as indicated at 980, in embodiments, using techniques such as described above for FIGS. 3-9.

Note that the methods described in FIGS. 3, 5, 7, 8, and 10 are merely examples. The methods may be implemented in software, hardware, or a combination thereof. The order of methods may be changed, and various elements may be added, reordered, combined, omitted, modified, etc.

Various embodiments may further include receiving, sending or storing instructions and/or data implemented in accordance with the foregoing description upon a computer-accessible medium or article of manufacture. Generally speaking, a computer-accessible medium or article of manufacture may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A distributed data system, comprising:
a plurality of network nodes each configured to execute one or more processes;
a data store configured to store primary data accessible by the processes; and
a hardware device configured to implement a lock mechanism coupled to the data store and configured to lock access to portions of the primary data, wherein the lock mechanism is configured to grant a lock to a requester for one of the processes for a primary data portion stored by the data store, wherein the lock mechanism is configured to prevent other processes from accessing the primary data portion while the requester is granted the lock;
wherein each process executing on the plurality of network nodes is configured to have a first thread of the process requesting access to a portion of the primary data request a lock for the portion of the primary data from the lock mechanism, wherein the first thread remains, while one or more other threads of the process access the locked portion of the primary data, to release the lock, and wherein said first thread and said other threads each execute locally on one of said plurality of network nodes.

2. The distributed data system as recited in claim 1, wherein each of the processes is configured so that when its first thread obtains a lock for a primary data portion one or more other threads of the process requesting access to the primary data portion can access the primary data portion while the lock is held for that process.

3. The distributed data system as recited in claim 2, wherein each of the processes is configured to:
increment a count corresponding to the lock for the portion of the primary data in response to a thread of the process requesting access to the portion of the primary data;

decrement the count in response to a thread completing access to the locked portion of the primary data; and wherein the first thread that acquired the lock is configured to release the lock in response to the corresponding count reaching an initial value.

4. The distributed data system as recited in claim 1, wherein the first thread is configured to release a previously acquired lock when no more threads of that process request access to the primary data portion corresponding to the lock.

5. The distributed data system as recited in claim 1, wherein the lock mechanism is configured to allow only the requester for a lock to release the lock for the corresponding portion of the primary data.

6. The distributed data system as recited in claim 1, wherein the first thread is configured to hold the lock it acquires for its process until that process receives a request to release the lock.

7. The distributed data system as recited in claim 1, wherein the first thread is configured to release the lock it acquired for its process in response to an invalidate request from another thread in its process.

8. The distributed data system as recited in claim 1, wherein the plurality of network nodes comprise one or more application servers of a multi-tiered enterprise system.

9. The distributed data system as recited in claim 1, wherein the one of the processes comprises a Java virtual machine.

10. The distributed data system as recited in claim 1, wherein a portion of the primary data stored by the data store represents state information of a client-server session.

11. The distributed data system as recited in claim 1, wherein if a requester for a process holds a lock for a portion of the primary data, the lock mechanism is configured to buffer one or more requests for the lock for that portion of the primary from one or more other requesters for one or more other processes.

12. The distributed data system as recited in claim 11, wherein in response to the requester releasing the lock for the portion of the primary data, the lock mechanism is configured to grant the lock for that portion of the primary data to a next buffered requester for that primary data portion.

13. A computing system, comprising:
a processor;
memory comprising program instructions executable by the processor to implement:
 a process configured to access portions of distributed data stored within a distributed data store accessible to other processes;
 wherein the process is configured to have a first thread of the process requesting access to a portion of the distributed data request a lock for one of the portions of the distributed data from a lock mechanism of the distributed data store, wherein the first thread remains, while one or more other threads of the process access the locked portion of the distributed data, to release the lock, and wherein said first thread and said other threads all execute locally on the processor.

14. The computing system as recited in claim 13, wherein the process is configured so that when its first thread obtains a lock for a portion of the distributed data one or more other threads of the process requesting access to the locked portion of the distributed data can access the locked portion of the distributed data while the lock is held for the process.

15. The computing system as recited in claim 14, wherein the process is configured to:

increment a count corresponding to a portion of the distributed data in response to a thread of the processes requesting access to the portion of the distributed data;

decrement the count in response to a thread of the process completing access to the portion of the distributed data; and wherein the first thread that acquired the lock for the portion of the distributed data is configured to release the lock in response to the corresponding count reaching an initial value.

16. The computing system as recited in claim 13, wherein the first thread is configured to release a previously acquired lock when no more threads of that process request access to the portion of the distributed data corresponding to the lock.

17. The computing system as recited in claim 13, wherein the first thread is configured to hold a previously acquired lock for the process until the process receives a request to release the lock.

18. The computing system as recited in claim 13, wherein the first thread is configured to release a previously acquired lock in response to an invalidate request from another thread of the process.

19. The computing system as recited in claim 13, wherein the memory comprises program instructions executable by the processor to implement an application server for a multi-tiered enterprise system, wherein the process is configured to execute within the application server.

20. The computing system as recited in claim 13, wherein the process comprises a Java virtual machine.

21. The computing system as recited in claim 13, wherein a portion of the distributed data represents state information of a client-server session.

22. A method, comprising:
a first thread of a process determining if the process owns a lock for a portion of primary data stored in a distributed data store;
in response to determining that the process does not own the lock, the first thread requesting the lock for the portion of the primary data from a lock mechanism of the distributed data store;
in response to obtaining the lock, the first thread accessing the locked portion of primary data; and
the first thread remaining, while one or more other threads of the process access the locked portion of the primary data, to release the lock;
wherein said first thread and said other threads each execute locally on one of one or more network nodes.

23. The method as recited in claim 22, further comprising one or more other threads of the process accessing the portion of the primary data while the lock is granted to the process.

24. The method as recited in claim 23, further comprising:
incrementing a count corresponding to the portion of primary data for each thread of the process requesting access to the portion of primary data;
decrementing the count corresponding to the portion of primary data for each thread of the process completing access to the portion of primary data; and
the first thread releasing the lock for the portion of primary data for the process in response to the count reaching an initial value.

25. The method as recited in claim 22, further comprising, if no more threads of the process require access to the locked portion of primary data, the first thread releasing the lock on behalf of the process.

26. The method as recited in claim 22, further comprising the first thread holding the lock until requested to release the lock.

27. The method as recited in claim 22, further comprising:
another thread of the process requesting release of the lock for the portion of primary data; and
the first thread releasing the lock for the portion of primary data for the process in response to the other thread's request to release the lock.

28. A non-transitory computer-accessible storage medium, comprising program instructions computer-executable to implement:
a first thread of a process determining if the process owns a lock for a portion of primary data stored in a distributed data store;
in response to determining that the process does not own the lock, the first thread requesting the lock for the portion of the primary data from a lock mechanism of the distributed data store;
in response to obtaining the lock, the first thread accessing the locked portion of primary data; and
the first thread remaining, while one or more other threads of the process access the locked portion of the primary data, to release the lock;
wherein said first thread and said other threads each execute locally on one of one or more network nodes.

29. The storage medium as recited in claim 28, wherein the program instructions are further executable to implement one or more other threads of the process accessing the portion of the primary data while the lock is granted to the process.

30. The storage medium as recited in claim 29, wherein the program instructions are further executable to implement:
incrementing a count corresponding to the portion of primary data for each thread of the process requesting access to the portion of primary data;
decrementing the count corresponding to the portion of primary data for each thread of the process completing access to the portion of primary data; and
the first thread releasing the lock for the portion of primary data for the process in response to the count reaching an initial value.

31. The storage medium as recited in claim 28, wherein the program instructions are further executable to implement, if no more threads of the process require access to the locked portion of primary data, the first thread releasing the lock on behalf of the process.

32. The storage medium as recited in claim 28, wherein the program instructions are further executable to implement the first thread holding the lock until requested to release the lock.

33. The storage medium as recited in claim 28, wherein the program instructions are further executable to implement:
another thread of the process requesting release of the lock for the portion of primary data; and
the first thread releasing the lock for the portion of primary data for the process in response to the other thread's request to release the lock.

* * * * *